(12) United States Patent
Kim

(10) Patent No.: US 7,764,350 B2
(45) Date of Patent: Jul. 27, 2010

(54) LIQUID CRYSTAL DISPLAY

(75) Inventor: Dong-Gyu Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 332 days.

(21) Appl. No.: 11/546,841

(22) Filed: Oct. 12, 2006

(65) Prior Publication Data

US 2007/0085959 A1    Apr. 19, 2007

(30) Foreign Application Priority Data

Oct. 13, 2005   (KR) .................. 10-2005-0096540

(51) Int. Cl.
*G02F 1/1343* (2006.01)
(52) U.S. Cl. ..................... 349/143; 349/139
(58) Field of Classification Search ............ None
See application file for complete search history.

(56) References Cited

U.S. PATENT DOCUMENTS

| | | | | |
|---|---|---|---|---|
| 4,373,784 A | * | 2/1983 | Nonomura et al. | .......... 349/145 |
| 5,151,689 A | | 9/1992 | Kabuto et al. | |
| 6,118,584 A | * | 9/2000 | Van Berkel et al. | ......... 359/463 |
| 2005/0078263 A1 | | 4/2005 | Kim et al. | |
| 2005/0134540 A1 | | 6/2005 | Kim | |
| 2005/0140893 A1 | * | 6/2005 | Hong | .......... 349/139 |
| 2005/0174503 A1 | * | 8/2005 | Kim et al. | ............ 349/46 |
| 2006/0145990 A1 | * | 7/2006 | Kim et al. | ............ 345/94 |

FOREIGN PATENT DOCUMENTS

| | | |
|---|---|---|
| EP | 0406870 A2 | 1/1991 |
| FR | 2719936 | 11/1995 |
| KR | 20020057541 A | 7/2002 |

OTHER PUBLICATIONS

European Search Report dated Feb. 1, 2007 of corresponding European Patent Application No. 0602802.2.

* cited by examiner

*Primary Examiner*—Tina M Wong
(74) *Attorney, Agent, or Firm*—F. Chau & Associates, LLC

(57) ABSTRACT

A liquid crystal display includes a plurality of pixels including pixel electrodes and switching devices connected to the pixel electrodes and arrayed in a matrix, a plurality of pairs of first and second gate lines connected to the switching devices and separated from each other, and a plurality of data lines connected to the switching devices and intersecting the first and second gate lines, wherein the plurality of data lines are connected so that end portions of two data lines in each pair of the data lines are connected to each other.

35 Claims, 18 Drawing Sheets

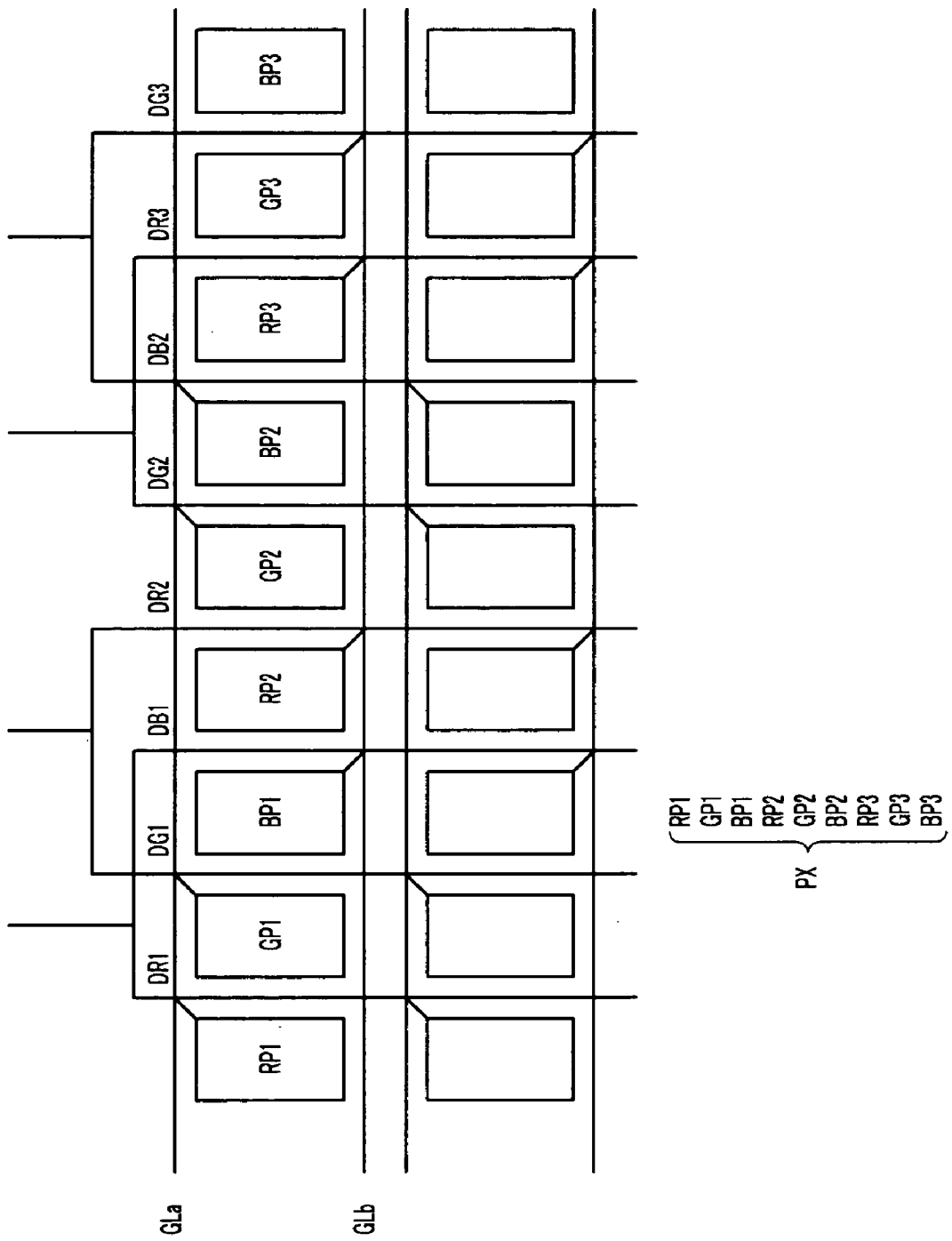

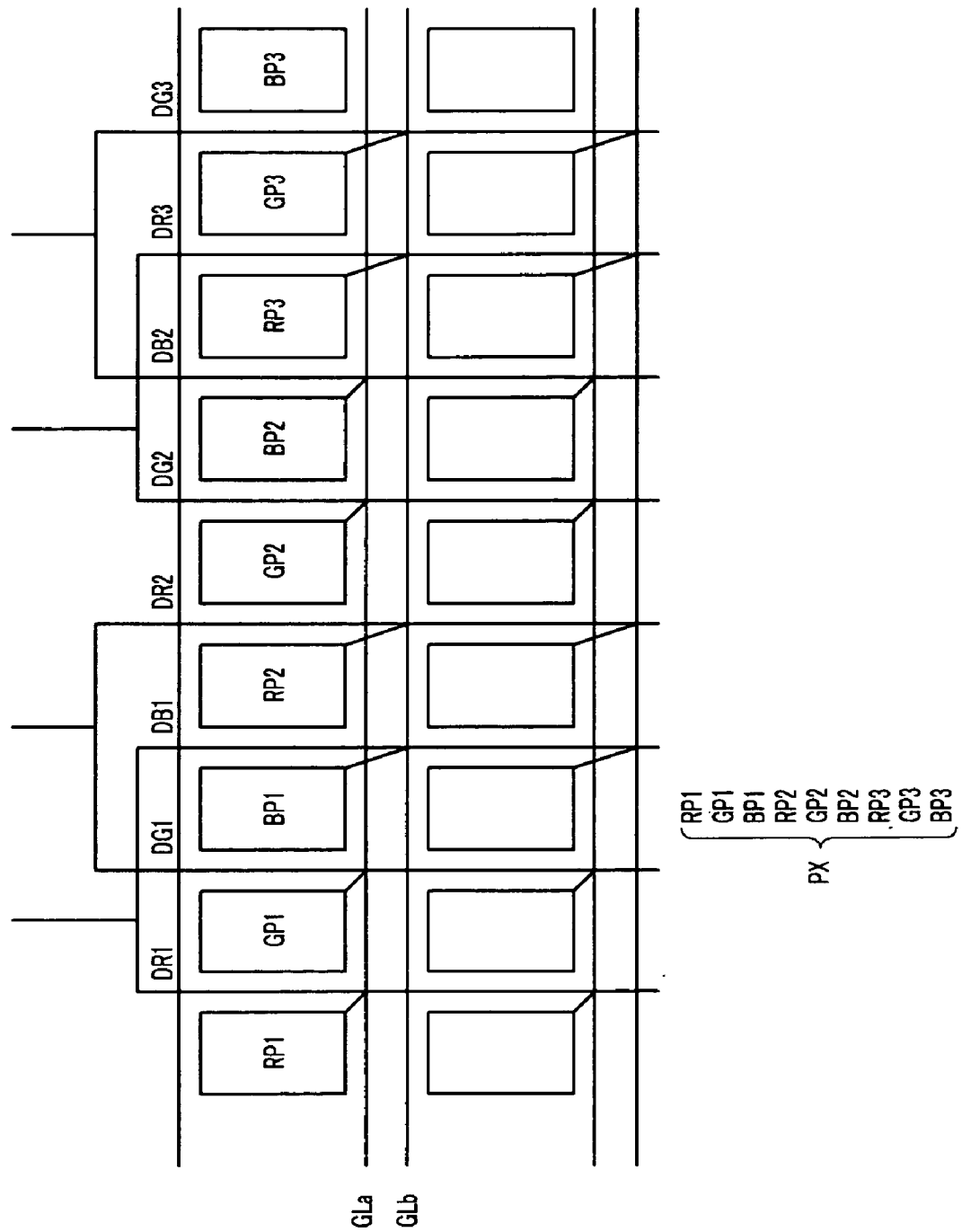

LIQUID CRYSTAL DISPLAY

CROSS-REFERENCE TO RELATED APPLICATION

This application claims priority to and the benefit of Korean Patent Application No. 10-2005-0096540 filed in the Korean Intellectual Property Office on Oct. 13, 2005, the entire contents of which are incorporated herein by reference.

BACKGROUND OF THE INVENTION (a) Technical Field

The present disclosure relates to a liquid crystal display.

(b) Discussion of the Related Art

A liquid crystal display (LCD), which is one of the flat panel display apparatuses that is being most widely used, includes two panels having electric field generating electrodes, such as pixel electrodes, and a common electrode and a liquid crystal layer interposed between the two panels.

The LCD displays an image by applying a voltage to the electric field generating electrodes to generate an electric field in the liquid crystal layer and by determining alignment of the liquid crystal molecules in the liquid crystal layer to control the polarization of incident light.

The LCD includes switching devices and a plurality of signal lines, such as gate and data lines, for controlling the switching devices connected to pixel electrodes to apply voltages to the pixels.

The gate lines transmit gate signals generated by a gate driver circuit, and the data lines transmit data voltages generated by a data driver circuit. The switching devices transmit the data voltages to the pixel electrodes according to the gate signals.

The gate and data driver circuits are directly mounted on the panels in the form of integrated chips. Otherwise, the gate and data driver circuits can be mounted on flexible printed circuit films that are attached to the panels. The integrated circuit chips are responsible for a large portion of production costs of the liquid crystal display.

More specifically, since the data driver integrated chips are much more expensive than the gate driver integrated chips, there is a need to reduce the number of data driver integrated chips for a high-resolution, large-sized liquid crystal display.

When the gate driver circuits together with gate lines, data lines, and switching devices are integrated into the panels, the production costs can be reduced. Since the structure of the data driver circuits is relatively complicated, however, the data circuits are not easy to integrate into the panels, so that there is a need to greatly reduce the number of data driver circuits.

The above information disclosed in this Background section is only for enhancement of an understanding of the background of the invention and, therefore, it may contain information that does not form the prior art that is already known in this country to a person of ordinary skill in the art.

SUMMARY OF THE INVENTION

An exemplary embodiment of the present invention has been made in an effort to provide a liquid crystal display having advantages of reducing the number of data driver circuit chips.

An exemplary embodiment of the present invention has also been made in an effort to provide a liquid crystal display having advantages of having uniform luminance of pixels and no variation in aspect ratios of the pixels.

An exemplary embodiment of the present invention provides a liquid crystal display including a plurality of pixels having pixel electrodes and switching devices connected to the pixel electrodes and arrayed in a matrix, a plurality of pairs of first and second gate lines connected to the switching devices and separated from each other, and a plurality of data lines connected to the switching devices and intersecting the first and second gate lines. The plurality of data lines are connected so that end portions of two data lines in each pair of data lines are connected to each other.

In an exemplary embodiment of the present invention, each of the pixels may include first to third pixels representing three different colors.

In addition, a data line connected to the first pixel and a data line connected to the second pixel may be connected to each other, and two adjacent data lines connected to the third pixel may be connected to each other.

Each of the pixel electrodes may include at least two parallelogrammic electrode pieces having different slant directions.

Each of the pixel electrodes may include one right slant parallelogrammic electrode piece and one left slant parallelogrammic electrode piece.

Each of the pixel electrodes may include two right slant parallelogrammic electrode pieces and two left slant parallelogrammic electrode pieces.

The right slant parallelogrammic electrode pieces and the left slant parallelogrammic electrode pieces may be alternately arrayed upward and downward.

Each of the first and second gate lines may extend across a boundary where the right slant parallelogrammic electrode pieces and the left slant parallelogrammic electrode pieces are connected to each other in an up-down direction.

Each of the pixel electrodes of the first and second pixels may include three right slant parallelogrammic electrode pieces and three left slant parallelogrammic electrode pieces, and the pixel electrode of the third pixel may include two right slant parallelogrammic electrode pieces and two left slant parallelogrammic electrode pieces.

The three right slant parallelogrammic electrode pieces and the three left slant parallelogrammic electrode pieces of the pixel electrode of each of the first and second pixels may be connected to each other in an up-down direction to constitute first to third base electrodes, wherein the first and second base electrodes may be connected to each other in a row direction, wherein the first and third base electrodes may be connected to each other in a column direction, and wherein the right slant parallelogrammic electrode pieces and the left slant parallelogrammic electrode pieces of the pixel electrode of the third pixel may be alternately connected upward and downward.

Areas of the pixel electrodes of the first to third pixels may be substantially equal to each other.

A width of the pixel electrode of the third pixel may be larger than those of the pixel electrodes of the first and second pixels. The width of the pixel electrode of the third pixel may be 1.4 to 1.6 times the widths of the first and second pixels.

The pixel electrodes of the first and second pixels may have left-right inverted symmetry.

The first pixel may be connected to the first gate line. The second pixel may be connected to the second gate line.

The third pixels at different columns may be alternately connected to the first or second gate line. The third pixels at the different columns may be alternately charged.

The liquid crystal display may further include gate protrusions, wherein at least one gate protrusion may be disposed at portions where the data lines intersect the first and second gate lines.

Each of the pixel electrodes may have four edges that are parallel to the gate and data lines.

A portion of the data line may overlap the pixel electrode. The pixel electrode may cover first and second gate lines of the last stage.

The liquid crystal display may further include storage electrode lines that transmit storage electrode signals. The storage electrode lines may include extensions that extend upward and downward. The extensions of the storage electrode lines may extend into spaces between adjacent pixel electrodes.

The data line may include first and second portions which overlap the two adjacent pixel electrodes, respectively.

Areas of the first and second portions of the data line may be equal to each other. Widths of the first and second portions of the data line may be different from each other. A length of the first portion may be larger than that of the second portion, and a width of the first portion may be smaller than that of the second portion.

The first portion may include third and fourth portions that are separated from one of the two pixel electrodes and overlap the one of the two pixel electrodes. The third and fourth portions of the data line may be disposed along a straight line, and the second portion may be curved at the third and fourth portions.

The data line may extend in a straight line.

Polarities of data voltages of two adjacent data lines among the data lines may be opposite to each other.

The adjacent data lines may be connected to each other.

The liquid crystal display may further include organic films that are formed between the pixel electrode and the data lines and between the pixel electrode and the first and second gate lines.

The liquid crystal display may further include a plurality of color filters that are disposed under the pixel electrodes.

Overlapped areas of the first and second gate lines overlapping the third pixel may be equal to each other.

BRIEF DESCRIPTION OF THE DRAWINGS

Exemplary embodiments of the present invention will be understood in more detail from the following descriptions taken in conjunction with the accompanying drawings, in which:

FIG. 6 is a view showing a spatial arrangement of pixels and signal lines of a liquid crystal display according to an exemplary embodiment of the present invention;

FIG. 7 is a view showing a spatial arrangement of pixels and signal lines of a liquid crystal display according to an exemplary embodiment of the present invention;

DETAILED DESCRIPTION OF EXEMPLARY EMBODIMENTS

Hereinafter, exemplary embodiments of the present invention will be described in detail with reference to the attached drawings such that the present invention can be easily put into practice by those skilled in the art.

A liquid crystal display LCD according to an exemplary embodiment of the present invention is described with reference to FIGS. 1,2, 3A, and 3B.

Figure 1:
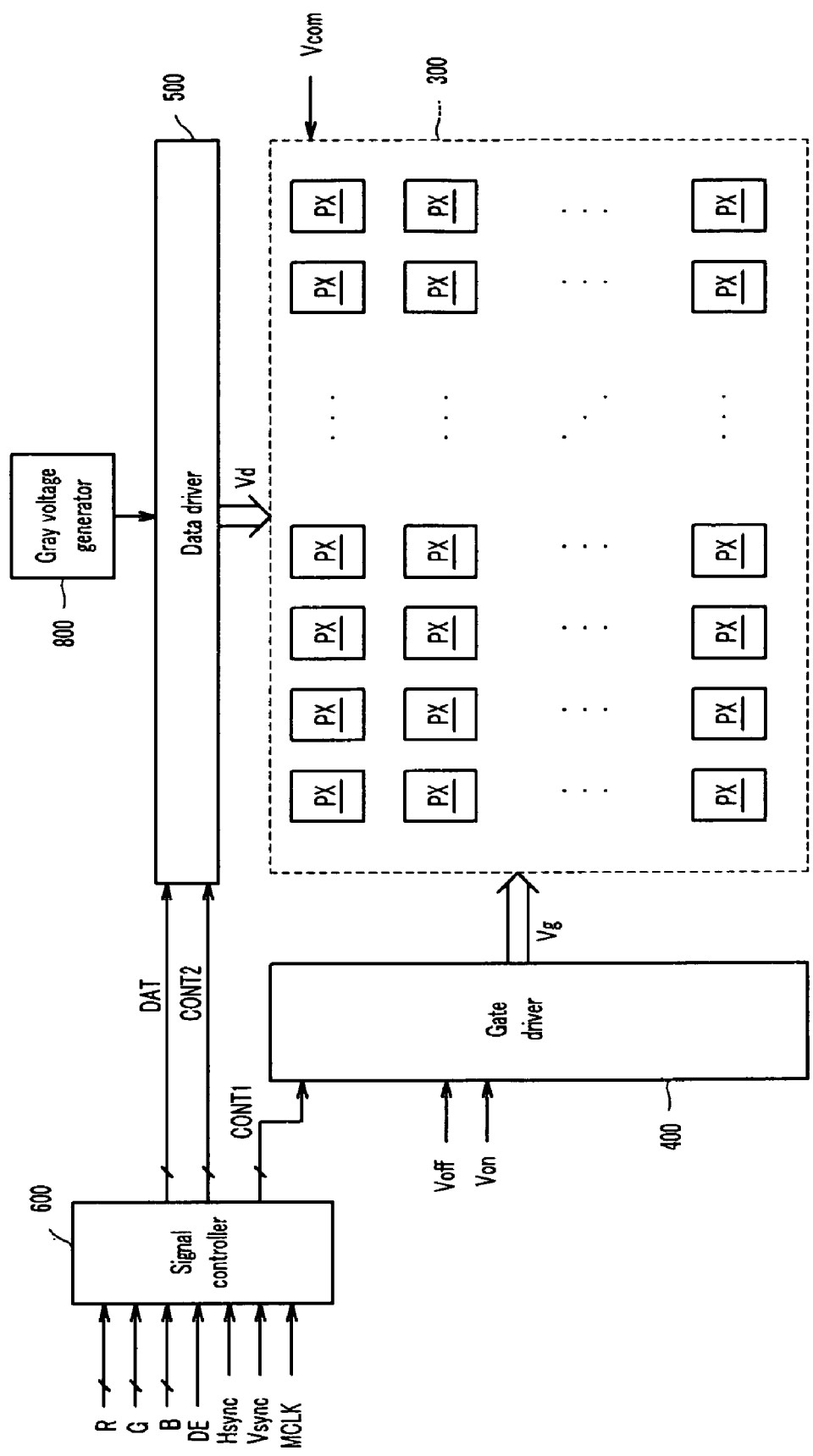
FIG. 1 is a block diagram showing a liquid crystal display according to an exemplary embodiment of the present invention.
Figure 2:
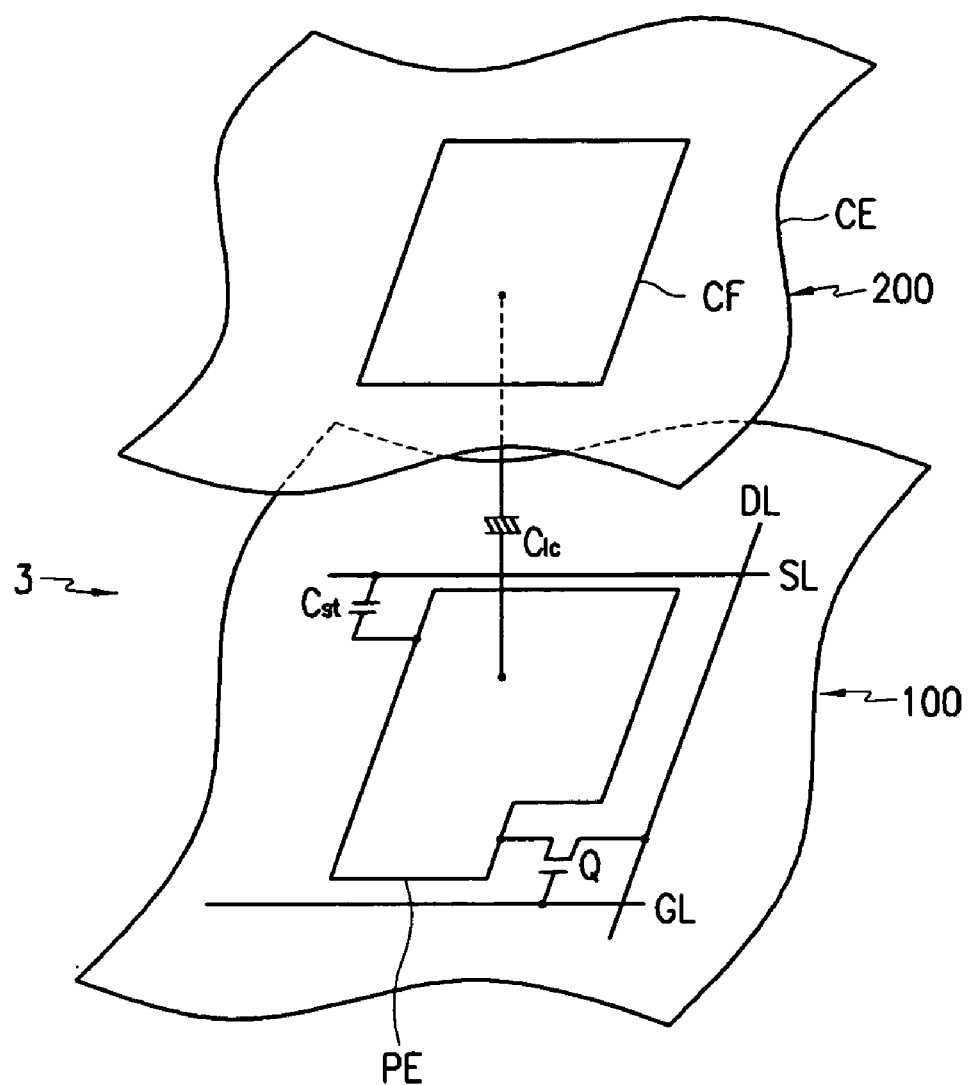
FIG. 2 is an equivalent circuit diagram of a pixel in a liquid crystal display according to an exemplary embodiment of the present invention.
Figure 3A:
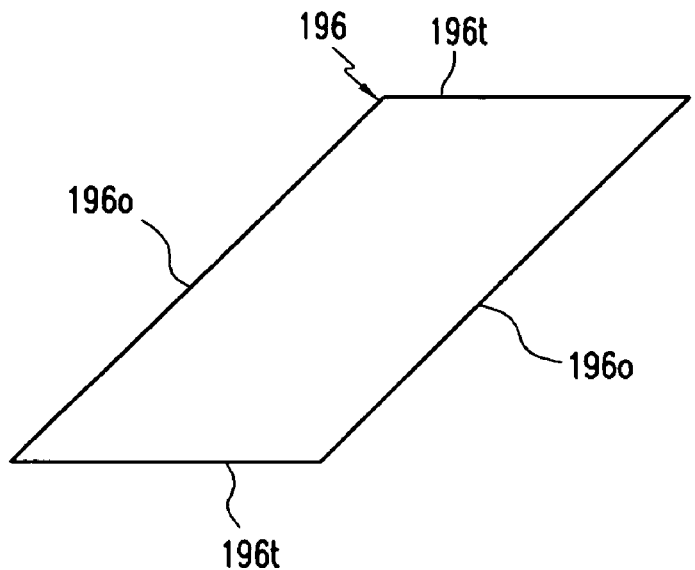
FIGS. 3A and 3B are views for explaining a pixel electrode in a liquid crystal display according to an exemplary embodiment of the present invention.
Figure 3B:
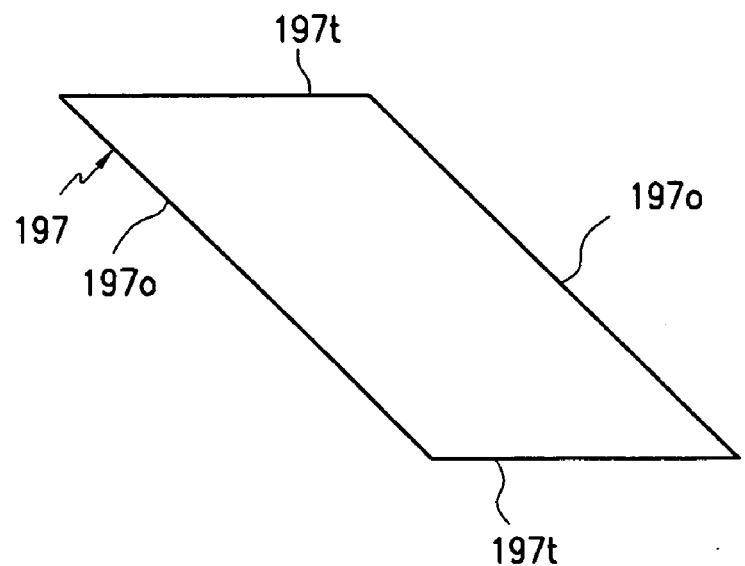

FIG. 1 is a block diagram showing a liquid crystal display according to an exemplary embodiment of the present invention, FIG. 2 is an equivalent circuit diagram of a pixel in a liquid crystal display according to an exemplary embodiment of the present invention, and FIGS. 3A and 3B are views for explaining a pixel electrode in a liquid crystal display according to an exemplary embodiment of the present invention.

Referring to FIGS. 1 and 2, the LCD includes a liquid crystal display panel assembly 300, a gate driver 400 and a data driver 500 that are connected to the liquid crystal display panel 300, a gray voltage generator 800 that is connected to the data driver 500, and a signal controller 600 that controls the above units.

The liquid crystal display panel assembly 300 includes a plurality of pixels PX that are connected to a plurality of signal lines (not shown) and arrayed substantially in a matrix.

In the structure shown in FIG. 2, the liquid crystal display panel assembly 300 includes lower and upper panels 100 and 200 facing each other and a liquid crystal layer 3 interposed therebetween.

The signal lines include a plurality of gate lines (not shown) for transmitting gate signals (sometimes referred to as "scan signals") and a plurality of data lines (not shown) for transmitting data signals.

The gate lines extend in parallel to each other substantially in a row direction, and the data lines extend in parallel to each other substantially in a column direction.

Each pixel PX includes a switching device Q and a liquid crystal capacitor Clc connected to the switching device Q and a storage capacitor Cst.

The storage capacitor Cst may be omitted as desired.

The switching devices Q are constructed with thin film transistors and the like in the lower panel 100. Each of the switching devices is a three-port device having a control port connected to the gate line GL, an input port connected to the data line DL, and an output port connected to the liquid crystal capacitor Clc and the storage capacitor Cst.

The pixel electrode PE is connected to the switching device Q, and the common electrode CE is disposed on the entire surface of the upper panel 200 to receive a common voltage Vcom.

Unlike what is shown in FIG. 2, the common electrode CE may be disposed on the lower panel 100. In this case, at least one of the two electrodes PE and CE may be formed in the shape of a line or bar.

The pixel electrode PE includes at least one parallelogrammic electrode piece 196 shown in FIG. 3A and one parallelogrammic electrode piece 197 shown in FIG. 3B.

As shown in FIGS. 3A and 3B, each of the electrode pieces 196 and 197 has a shape of a parallelogram with a pair of oblique edges 196o (197o) and a pair of transverse edges 196t (197t).

The oblique edges 196o and 197o have oblique angles with respect to the transverse edges 196t and 197t, and sizes of the oblique angles are preferably in a range of from 45° to 135°.

The electrode piece slanted in the rightward direction is referred to as a "right slant" electrode piece as shown in FIG. 3A, and the electrode piece slanted in the leftward direction is referred to as a "left slant" electrode piece as shown in FIG. 3B.

The shape of the pixel electrode PE is not limited thereto, however, and a substantially rectangular shape may also be used.

The storage capacitor Cst having an auxiliary function for the liquid crystal capacitor Clc is constructed by overlapping a separate signal line (not shown) and the pixel electrode PE provided to the lower panel 100 with an insulating member interposed therebetween, and a predetermined voltage such as a common voltage Vcom is applied to the separate signal line.

Alternatively, the storage capacitor Cst may be constructed by overlapping the pixel electrode PE and a last stage gate line disposed just above it with an insulating member interposed therebetween.

In order to implement a color display, each of the pixels PX uniquely displays one of the primary colors (spatial division), or each of the pixels PX alternately displays the primary colors according to time (time division). A desired color can be obtained by a spatial or time combination of the primary colors.

An example of the primary colors is the three primary colors, such as red, green, and blue.

FIG. 2 shows an example of the spatial division implementation. As shown in FIG. 2, each of the pixels PX includes a color filter CF for representing one of the primary colors, which is provided to a region of the upper panel 200 corresponding to the pixel electrode PE.

Unlike what is shown in FIG. 2, the color filter CF may be provided above or under the sub pixel electrode PE of the lower panel 100.

Hereinafter, each of color filters CF is assumed to represent one of red, green, and blue. A pixel including a red color filter CF is referred to as a red pixel, a pixel including a green color filter CF is referred to as a green pixel, and a pixel including a blue color filter CF is referred to as a blue pixel.

In addition, a pixel electrode included in the red pixel is referred to as a red pixel electrode, a pixel electrode included in the green pixel is referred to as a green pixel electrode, and a pixel electrode included in the blue pixel is referred to as a blue pixel electrode.

The red, blue, and green pixels are sequentially arrayed in a row direction.

At least one polarizer (not shown) for polarizing light is attached on an outer surface of the liquid crystal display panel assembly 300.

Now, liquid crystal displays according to exemplary embodiments of the present invention are described in detail with reference to FIGS. 4 to 7.

FIGS. 4 to 7 are views showing spatial arrangements of pixels and signal lines of the liquid crystal displays according to exemplary embodiments of the present invention.

Figure 4:
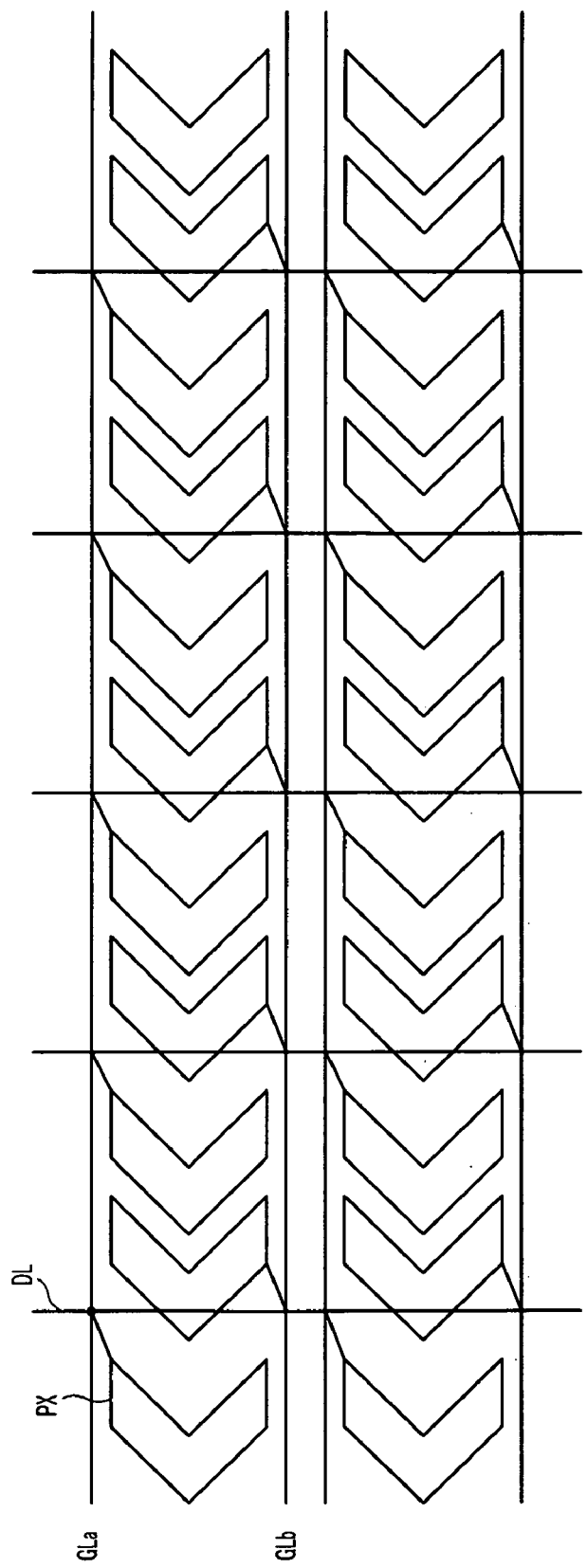
FIG. 4 is a view showing a spatial arrangement of pixels and signal lines of a liquid crystal display according to an exemplary embodiment of the present invention.

Referring to FIG. 4, in the liquid crystal display according to the exemplary embodiment, the pixels PX are arrayed in a matrix.

A pair of first and second gate lines GLa and GLb is disposed to extend in the transverse direction along upper and lower edges of one pixel row, and one data line is disposed to two pixel columns.

Therefore, a pair of pixel electrodes is disposed between a pair of adjacent data lines in each pixel row.

As described above, each of the pixel electrodes PE constituting the pixels PE is connected through the switching device Q to one gate line and one data line, and in one pixel row the pixel electrodes PE are alternately connected to the first and second gate lines GLa and GLb.

In the same pixel column, the pixel electrodes are connected to the same gate lines among the first and second gate lines GLa and GLb.

Namely, in one pixel row, a pair of pixel electrodes disposed between the two adjacent data lines are connected to different gate lines and connected to different data lines.

Figure 5:
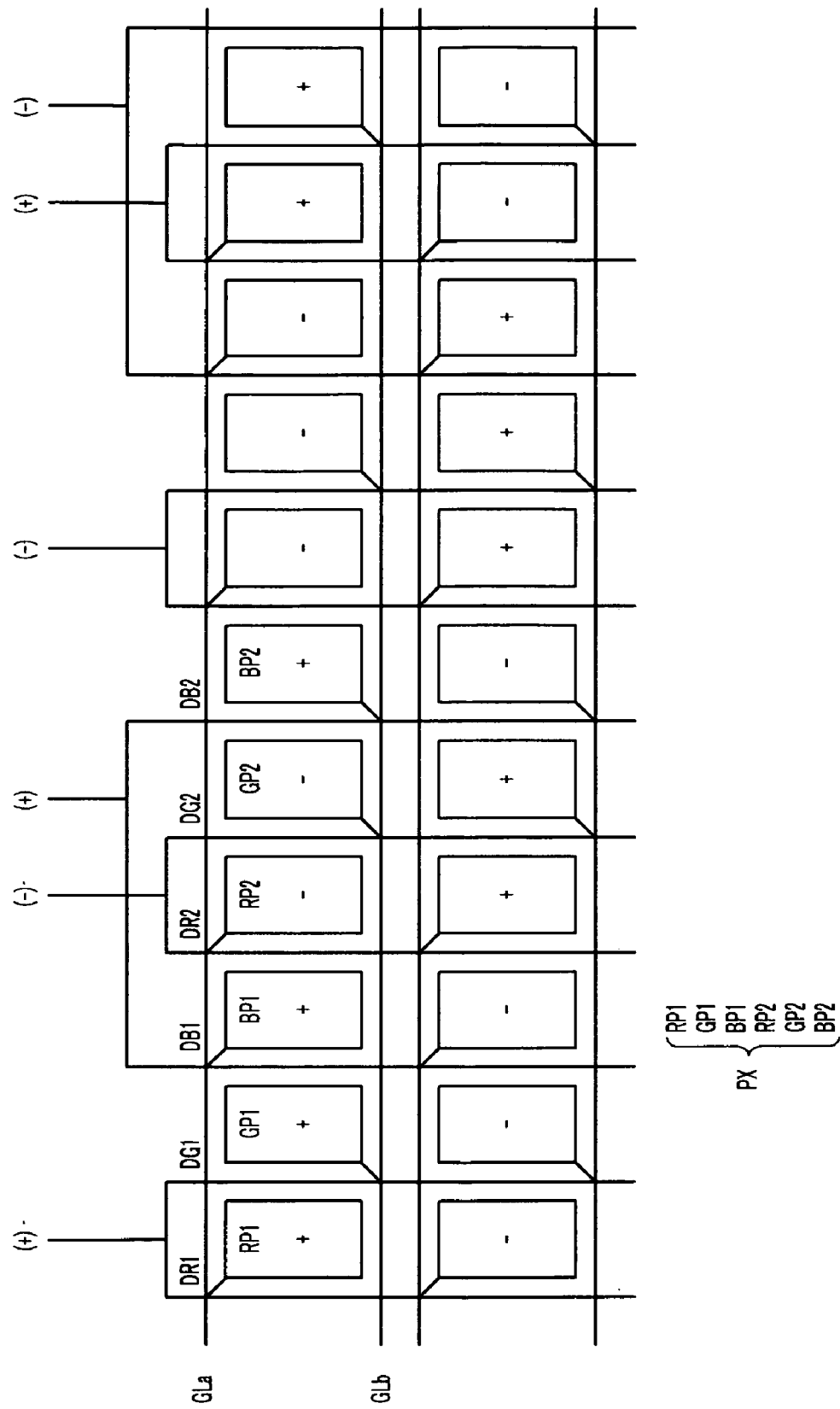
FIG. 5 is a view showing a spatial arrangement of pixels and signal lines of a liquid crystal display according to an exemplary embodiment of the present invention.

Referring to FIG. 5, the liquid crystal display according to an exemplary embodiment of the present invention includes pixels that are arrayed in a matrix.

The pixel PX includes red pixels RP1 and RP2, green pixels GP1 and GP2 and blue pixels BP1 and BP2, which represent three different colors (for example, red, green, and blue) according to types of the color filters (not shown).

Pixels of the three types are sequentially arrayed in the order of red, green, and blue in the row direction, and pixels of the same type are adjacent to each other in the column direction.

As shown in FIG. 4, a pair of the gate lines GLa and GLb is disposed along upper and lower edges of each pixel row.

Unlike what is shown in FIG. 4, in the pixel arrangement shown in FIG. 5, the red pixels RP1 and RP2 are connected to the first gate lines GLa, and the green pixels GP1 and GP2 are connected to the second gate lines GLb.

The blue pixels BP1 and BP2 are alternately connected to the first and second gate lines GLa and GLb.

The connection arrangement between the pixels PX and the gate lines GLa and GLb repeats in every pixel row.

In addition, unlike FIG. 4, in the pixel arrangement shown in FIG. 5, one data line is provided for each of the pixel columns, and the pixel electrodes of each pixel PX are connected to different data lines.

Here, the data line DR1/DR2 connected to the first/second red pixel RP1/RP2 and the data line DG1/DG2 connected to the first/second green pixel GP1/GP2 are connected to each other.

In addition, the data line DB1 connected to the first blue pixel BP1 and the data line DB2 connected to the second blue pixel BP2 are connected to each other.

In this manner, since the data lines are connected in groups of two data lines, it is possible to reduce the number of data drivers in the form of data driver circuit chips mounted on the liquid crystal display.

In addition, since the data lines are provided to all the pixels in the same manner, it is possible to uniformly maintain a variation in the pixel electrode voltage caused from parasitic capacitances generated between the data line and the pixel electrodes in every pixel.

Therefore, it is possible to uniformly maintain the luminance of the pixels.

In addition, it is possible to prevent a variation in the aspect ratios of the pixels.

Referring to FIG. 6, the liquid crystal display according to the embodiment also includes pixels PX that are arrayed in a matrix, and the pixels PX includes pixels representing three different colors, that is, red pixels RP1, RP2, and RP3, green pixels GP1, GP2, and GP3, and blue pixel BP1, BP2, and BP3.

Similar to FIG. 4, in FIG. 5, a pair of the gate lines GLa and GLb is disposed along upper and lower edges of each pixel row, and one data line is provided to each pixel column.

Unlike what is shown in FIG. 5, however, in one pixel row, adjacent groups of two pixels PX are connected to different gate lines.

For example, the first red pixel RP1 and the first green pixel GP1 are connected to the first gate line GLa, and the first blue pixel BP1 and the second red pixel RP2 are connected to the second gate line GLb.

The connection repeats in every pixel row.

Two even-numbered data lines connected to the pixels are connected to each other, and two odd-numbered data lines connected to the pixels are connected to each other.

In other words, every other data line is connected together.

For example, the data line DR1 connected to the first red pixel RP1 is connected to the data line DB1 that is connected to the first blue pixel BP1. The data line DG1 connected to the first green pixel GP1 is connected to the data line DR2 that is connected to the second red pixel RP2. The data line DG2 connected to the second green pixel GP2 is connected to the data line DR3 that is connected to the third red pixel RP3. The data line DB2 connected to the second blue pixel BP2 is connected to the data line DG3 that is connected to the third green pixel GP3.

Referring to FIG. 7, the liquid crystal display according to an exemplary embodiment also includes pixels PX that are arrayed in a matrix, and the connection between the pixels PX and the gate lines GLa and GLb, the arrangement of the data lines, and the connection of the data lines are the same as those of the liquid crystal display shown in FIG. 5.

Unlike what is shown in FIG. 6, in FIG. 7 a pair of gate lines GLa and GLb for one pixel row is disposed between the one pixel row and the adjacent pixel row.

Returning to FIG. 1, the gray voltage generator 800 generates two gray voltage sets (reference gray sets) corresponding to the light transmittance of the pixels PX.

The one gray set has a positive value with respect to the common voltage $V_{com}$, and the other gray voltage set has a negative value with respect to the common voltage $V_{com}$.

The gate driver 400 is connected to the gate lines $G_1$ to $G_n$ (not shown) of the liquid crystal panel assembly 300 to apply gate signals constructed with a combination of gate-on and gate-off voltages $V_{on}$ and $V_{off}$ to the gate lines $G_1$ to $G_n$.

The data driver 500 is connected to the data lines $D_1$ to $D_m$ (not shown) of the liquid crystal panel assembly 300 to select the gray voltage from the gray voltage generator 800 and apply the gray voltages as data signals to the data lines $D_1$ to $D_m$.

Alternatively, in a case where the gray voltage generator 800 generates only a predetermined number of the reference gray voltages instead of all the gray voltages, the data driver 500 may generate the gray voltages for all the grays by dividing the reference gray voltages and select the data signals among the generated gray voltages.

The signal controller 600 controls the gate driver 400 and the data driver 500.

The gate driver 400 together with signal lines and thin film transistor switching devices Q is integrated into the liquid crystal display panel assembly 300.

The gate driver 400 may be divided into two drivers (not shown) that may be directly mounted in the form of IC chips on the liquid crystal display panel assembly 300. Alternatively, the gate driver 500 may be mounted on a flexible printed circuit (FPC) film (not shown) that may be attached in the form of a tape carrier package (TCP) on the liquid crystal display panel assembly 300. Otherwise, the gate driver 400 may be mounted on a separate printed circuit board (PCB) (not shown).

In addition, the driver, the controller, and the generator 500, 600, and 800 may be directly mounted in the form of IC chips on the liquid crystal display panel assembly 300. Alternatively, the driver, the controller, and the generator 500, 600, and 800 mounted on a flexible printed circuit (FPC) film (not shown) may be attached in the form of a tape carrier package (TCP) on the liquid crystal display panel assembly 300. Otherwise, the driver, the controller, and the generator 500, 600, and 800 may be mounted on a separate printed circuit board (PCB) (not shown).

Alternatively, the driver, the controller, and the generator 500, 600, and 800 together with signal lines and thin film transistor switching devices Q may be integrated into the liquid crystal display panel assembly 300.

In addition, the driver, the controller, and the generator 500, 600, and 800 may be integrated in the form of a single chip. In this case, at least one of the drivers or at least one circuit device constituting the drivers may be disposed outside the single chip.

Now, operations of the liquid crystal display apparatus will be described in detail.

The signal controller 600 receives input image signals R, G, and B and input control signals for controlling display thereof from an external graphic controller (not shown).

Input image signals R, G, and B contain luminance information of the pixels PX, and the luminance can be represented by a predetermined number of gray values, for example, $1024=2^{10}$, $256=2^8$, or $64=2^6$.

As an example of the input control signals, there are a vertical synchronization signal Vsync, a horizontal synchronization signal Hsync, a main clock signal MCLK, and a data enable signal DE.

The signal controller 600 processes the input image signals R, G, and B according to an operating condition of the liquid display panel assembly 300 based on the input control signals and the input image signals R, G, and B to generate a gate control signal CONT1, a data control signal CONT2, and the like, and after that, transmits the generated gate control signal CONT1 to the gate driver 400 and the generated data control signal CONT2 and the processed image signal DAT2 to the data driver 500.

The image signal process of the signal controller 600 includes an operation of rearranging the input image signals R, G, and B according to the pixel arrangement shown in FIG. 1.

The gate control signal CONT1 includes a scan start signal for indicating scan start and at least one clock signal for controlling an output period of the gate-on voltage $V_{on}$.

The gate control signal CONT1 may further include an output enable signal for defining a duration time of the gate-on voltage $V_{on}$.

The data control signal CONT2 includes a horizontal synchronization start signal for indicating data transmission for one pixel row, a load signal for commanding to apply the associated data voltages to the data lines $D_1$ to $D_m$ (not shown), and a data clock signal.

The data control signal CONT2 may further include an inversion signal for inverting a voltage polarity of the data signal with respect to the common voltage $V_{com}$, hereinafter, the phrase "the voltage polarity of the data signal with respect to the common voltage $V_{com}$" is shortened to a "data signal polarity".

In response to the data control signal CONT2 from the signal controller 600, the data driver 500 receives the digital image data DAT2 for one pixel row and selects the gray voltages corresponding to the digital image data DAT2, so that the digital image data DAT2 are converted into the associated analog data signals. After that, the analog data signals are applied to the associated data lines D1 to Dm.

The gate driver 400 applies the gate-on voltage $V_{on}$ to the gate lines $G_1$ to $G_n$ (not shown) according to the gate control signals CONT1 from the signal controller 600 to turn on the switching devices Q connected to the gate lines $G_1$ to $G_n$.

As a result, the data signals applied to the data lines $D_1$ to $D_m$ are applied to the associated pixels PX through the turned-on switching devices Q.

A difference between the voltage of the data signal applied to the pixel PX and the common voltage $V_{com}$ becomes a charge voltage of the liquid crystal capacitors $C_{LC}$, that is, a pixel voltage.

Alignment of the liquid crystal molecules varies according to the intensity of the pixel voltage.

Therefore, polarization of light passing through the liquid crystal layer 3 changes. The change in the polarization results in a change in transmittance of the light due to the polarizer attached to the liquid crystal panel assembly 300.

In units of one horizontal period (or 1H), that is, one period of the horizontal synchronization signal Hsync and the data enable signal DE, the aforementioned operations are repeatedly performed to sequentially apply the gate-on voltages $V_{on}$ to all the gate lines $G_1$ to $G_n$, so that the data signals are applied to all the pixels. As a result, one frame of an image is displayed.

When one frame ends the next frame starts, and a state of the inversion control signal applied to the data driver 500 is controlled so that the polarity of the data signal applied to each of the pixels is opposite to the polarity in the previous frame (frame inversion).

At this time, even in one frame, according to the characteristics of the inversion control signals, the polarity of the data signal flowing through the one data line may be inverted (row inversion and dot inversion). In addition, the polarities of the data signals applied to the one pixel row may be different from each other (column inversion and dot inversion).

Now, an inversion operation of a liquid crystal display according to the embodiment of the present invention is described in detail with reference to FIGS. 8A and 8B.

Figure 8A:
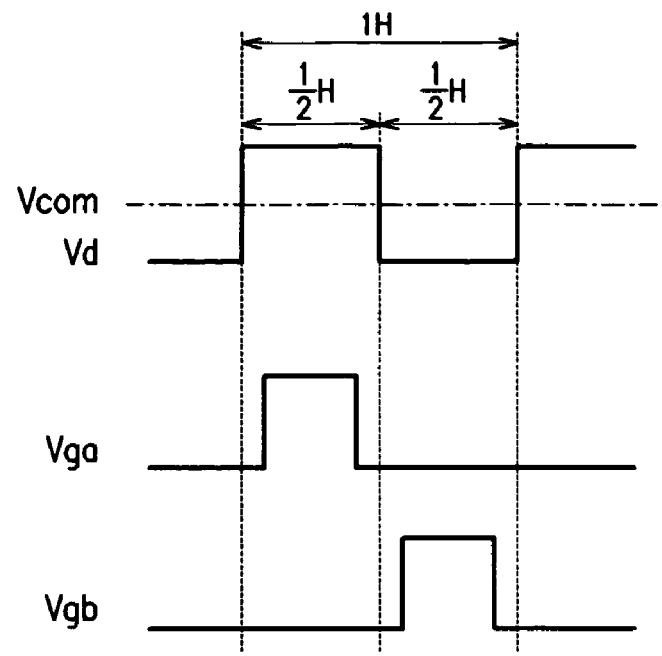
FIG. 8A shows waveforms of a common voltage, a data voltage, and a gate voltage when a liquid crystal display according to an exemplary embodiment of the present invention is driven.
Figure 8B:
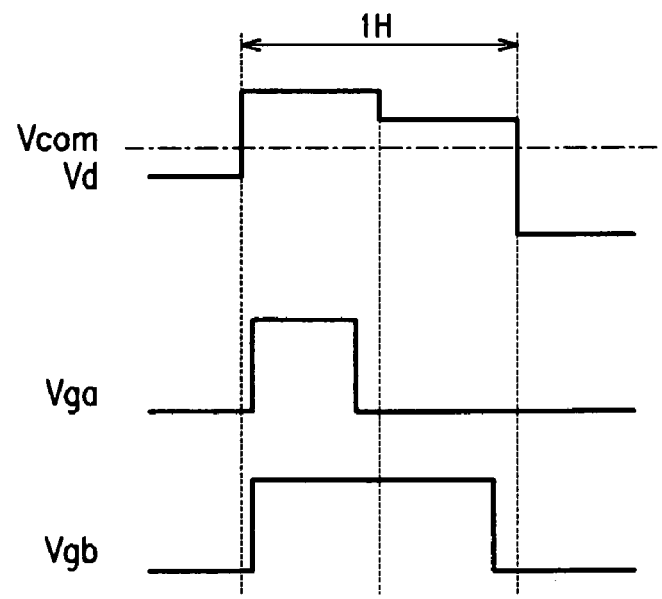
FIG. 8B shows waveforms of a common voltage, a data voltage, and a gate voltage when a liquid crystal display according to an exemplary embodiment of the present invention is driven.

FIGS. 8A and 8B are waveforms of a common voltage, a data voltage, and a gate voltage at the time of driving the liquid crystal display according to an exemplary embodiment of the present invention.

Firstly, an operation scheme relative to what is shown in FIG. 8A is described.

In the liquid crystal display according to the exemplary embodiment of the present invention shown in FIG. 5, since the number of the gate lines GLa and GLb is two per one pixel row, the time taken to scan one pixel row is ½H.

Therefore, the gate-on voltages Von are applied to the adjacent gate lines in a period of ½H.

In addition, in the liquid crystal display shown in FIG. 5, the number of data lines is equal to the number of pixel columns, but the gate lines are connected in groups of two data lines. Therefore, the same data voltage is applied to the pixels of the two pixel columns.

In addition, as shown in FIG. 7, for the dot inversion driving operation, the data driver 500 applies the data voltage to the two data lines in a period of ½H in a column inversion scheme.

As shown in FIG. 8B, however, the gate-on voltages Von applied to the two adjacent gate lines in a period of ½H overlap each other, so that a time of applying the gate-on voltages to the gate lines becomes 1H. Therefore, it is possible to obtain a sufficient charging time.

At this time, the data voltages are applied to the data lines of each data line pair in a period of 1H in the column inversion scheme.

The gate-on voltages Von are sequentially applied to all the gate lines during one frame, so that all the pixels have the data voltage applied to them.

When one frame ends the next frame starts, and a state of the reverse signal applied to the data driver 500 is controlled so that the polarity of the data signal applied to each of the pixels is opposite to the polarity in the previous frame.

FIG. 5 shows the polarities of the pixels in the driving scheme shown in FIG. 8B.

Referring to FIG. 5, a positive polarity data voltage (+) is applied to a first pair of data lines DR1 and DG1, and a negative polarity data voltage (−) is applied to a next pair of data lines DR2 and DG2. The positive polarity voltage (+) is applied to the next pair of data lines DB1 and DB2.

The first red pixel RP1, the first blue pixel BP1, and the second red pixel RP2 connected to the first gate line GLa are charged with the gate-on voltage for a first half-period ½H.

The first red pixel RP1 is applied with the positive polarity voltage (+) from the data line DR1 connected thereto. The first blue pixel BP1 is applied with the positive polarity voltage (+) from the data line DB1 connected thereto. The second red pixel RP2 is applied with the negative polarity voltage (−) from the data line DR2 connected thereto.

The first green pixel GP1, the second green pixel GP2, and the second blue pixel BP2 connected to the second gate line GLb are charged with the gate-on voltage for a second half-period ½H.

The first green pixel GP1 is applied with the positive polarity voltage (+) from the data line DG1 connected thereto. The second green pixel GP2 is applied with the negative polarity voltage (−) from the data line DG2 connected thereto. The second blue pixel BP2 is applied with the positive polarity voltage (+) from the data line DB2 connected thereto.

Therefore, in the first pixel row, the polarities of the first red pixel RP1, the first green pixel GP1, the first blue pixel BP1, the second red pixel RP2, the second green pixel GP2, and the second blue pixel BP2 are represented by (+++−−+) as shown in FIG. 5.

Polarities of the pixels of one pixel row are opposite to those of the pixels of the adjacent pixel row, and polarities of the pixels of one pixel column are also opposite to those of the pixels of the adjacent pixel column. The polarity arrangement repeats in the row and column directions.

Now, a liquid crystal display panel assembly according to an exemplary embodiment of the present invention is described in detail with reference to FIGS. 9, 10, and 1 to 4.

Figure 9:
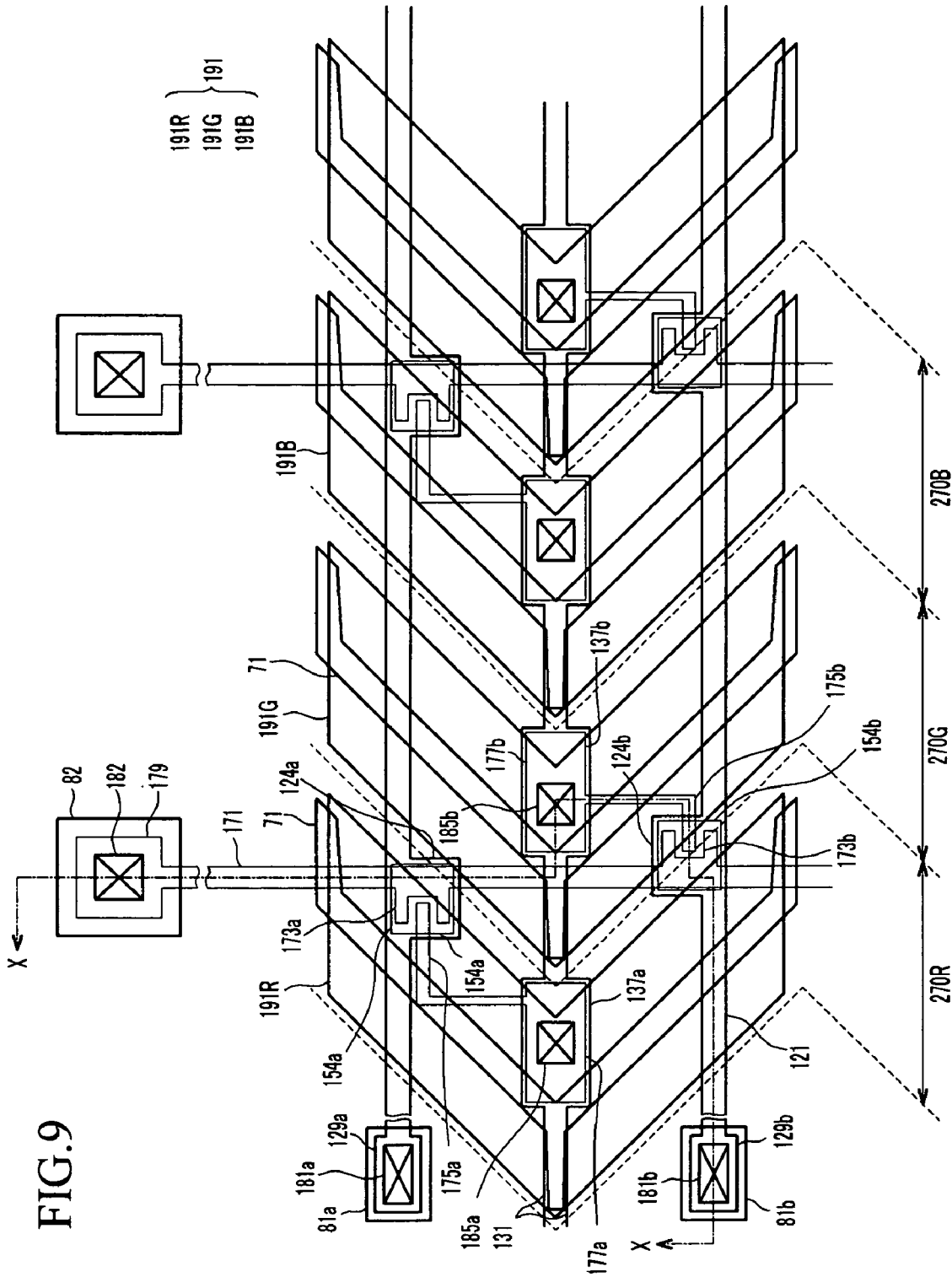
FIG. 9 is a view showing a layout of a liquid crystal display panel assembly according to an exemplary embodiment of the present invention.
Figure 10:
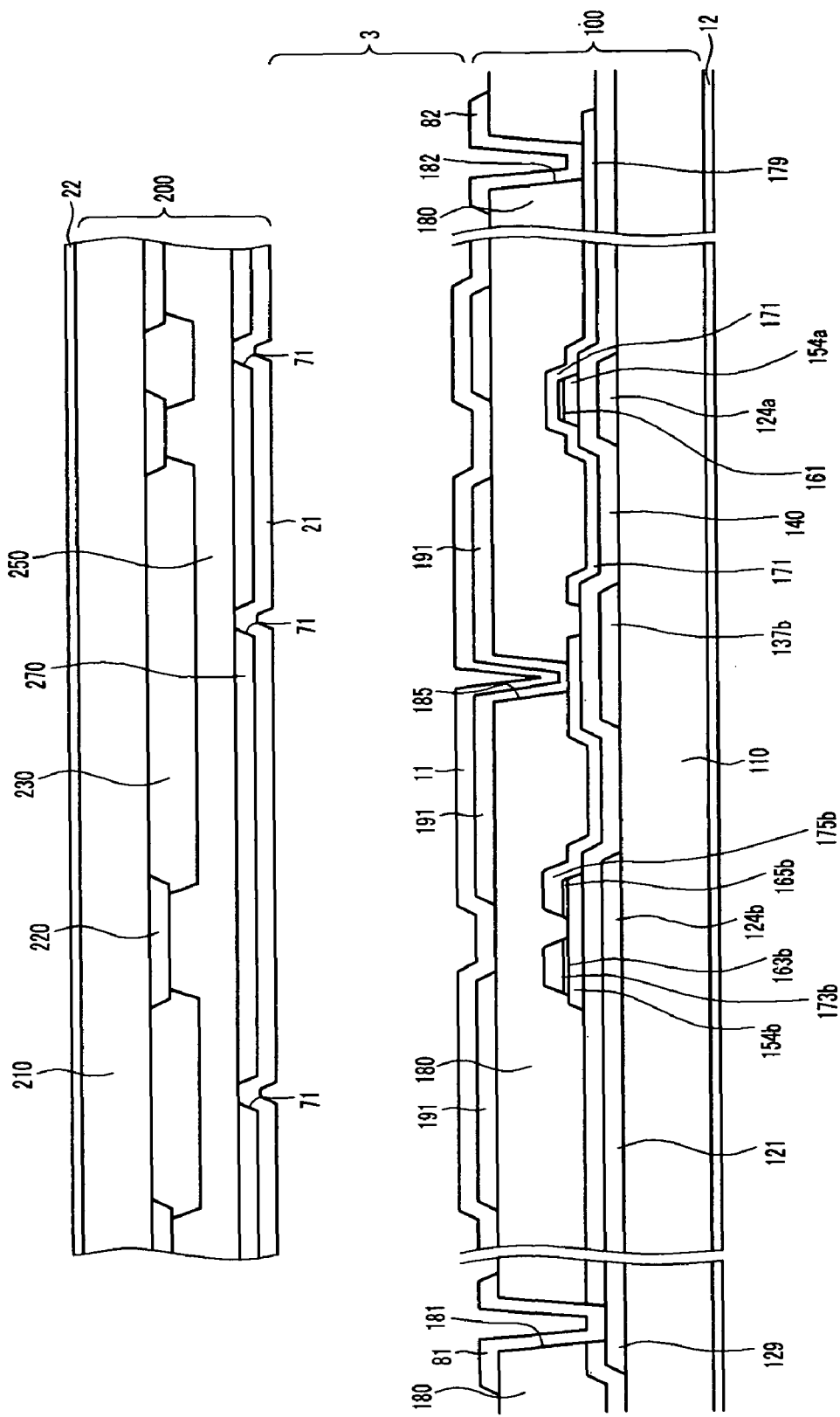
FIG. 10 is a cross-sectional view of the liquid crystal display panel assembly taken along line X-X of FIG. 9.

FIG. 9 is a view showing a layout of the liquid crystal display panel assembly according to an exemplary embodiment of the present invention, and FIG. 10 is a cross-sectional view of the liquid crystal display panel assembly taken along line X-X of FIG. 9.

As shown in FIGS. 9 and 10, the liquid crystal display panel assembly according to an exemplary embodiment of the present invention also includes lower and upper panels 100 and 200 facing each other and a liquid crystal layer 3 interposed therebetween.

Firstly, the lower panel 100 is described.

A plurality of gate conductors including a plurality pairs of first and second gate lines 121a and 121b and a plurality of storage electrode lines 131 are disposed on an insulating substrate 110 made of transparent glass or a plastic material.

The first and second gate lines 121a and 121b for transmitting gate signals mainly extend in the transverse direction and are disposed in upper and lower regions with respect to the storage electrode line 131.

The first gate line 121a includes a plurality of first gate electrodes 124a that protrude downwardly, and end portions 129a that have wide areas for connection to other layers or the gate driver 400.

The second gate line 121b includes a plurality of second gate electrodes 124b that protrude upwardly, and end portions 129b that have wide areas for connection to other layers or the gate driver 400.

In a case where the gate driver 400 is integrated into the substrate 110, the first and second gate lines 121a and 121b extend to be directly connected to the gate driver.

The storage electrode lines 131 receive a predetermined voltage such as a common voltage Vcom, and extend to be substantially parallel to the first and second gate lines 121a and 121b.

Each of the storage electrode lines 131 are disposed between the first gate line 121a and the second gate line 121b, and distances from the storage electrode line to the adjacent gate lines 121a and 121b are substantially equal to each other.

Each of the storage electrode lines 131 includes a plurality of pairs of first and second storage electrodes 137a and 137b that are enlarged upwardly and downwardly.

Various shapes and arrangements, however, may be used for the storage electrodes 137a and 137b and the storage electrode lines 131.

The gate conductors 121a, 121b, and 131 may be made of an aluminum-based metal such as aluminum (Al) and an aluminum alloy, a silver-based metal such as silver (Ag) and a silver alloy, a copper-based metal such as copper (Cu) and a copper alloy, a molybdenum-based metal such as molybdenum (Mo) and a molybdenum alloy, chromium (Cr), tantalum (Ta) or titanium (Ti).

The gate conductors 121a, 121 b, and 131, however, may have a multi-layered structure of two conductive layers (not shown) having different physical properties.

One of the two conductive layers is made of a metal having a low resistivity, for example, an aluminum-based metal, a silver-based metal, and a copper-based metal, in order to reduce signal delay or voltage drop.

The other of the two conductive layers is made of a material having good contact characteristics to other materials, particularly to ITO (indium tin oxide) and IZO (indium zinc oxide), such as a molybdenum-based metal, chromium, titanium, and tantalum.

As examples of the combination, there is a combination of a lower chromium layer and an upper aluminum layer and a combination of a lower aluminum layer and an upper molybdenum layer.

The gate conductors 121a, 121b, and 131, however may be made of various metals or conductive materials.

In addition, side surfaces of the gate conductors 121a, 121b, and 131 are slanted with respect to a surface of the substrate 110, and the slanted angle is preferably in a range of about 30° to about 80°.

A gate insulating layer 140 made of a silicon nitride $SiN_x$, a silicon oxide $SiO_x$ or the like is formed on the gate conductors 121a, 121b, and 131.

A plurality of first and second island-shaped semiconductors 154a and 154b made of a hydrogenated amorphous silicon (abbreviated to a-Si) or polysilicon are formed on the gate insulating film 140.

The first and second semiconductors 154a and 154b are disposed on the first and second gate electrodes 124a and 124b, respectively.

A plurality of island-shaped ohmic contacts 163b and 165b are formed on the first and second semiconductors 154a and 154b.

The ohmic contacts 163b and 165b may be made of silicide or an n+ hydrogenated amorphous silicon that is heavily doped with n-type impurities, such as phosphorus (P).

A pair of the ohmic contacts 163b and 165b is disposed on the semiconductor 154b, and a pair of the island-shaped ohmic contacts (not shown) different from the ohmic contacts 163a and 163b are disposed on the semiconductor 154a.

Side surfaces of the semiconductors 154a and 154b and the ohmic contacts 163b and 165b are also slanted with respect to the substrate 110, and the slanted angle is in a range of about 30° to about 80°.

Data conductors including a plurality of data lines 171 and a plurality of pairs of first and second drain electrodes 175a and 175b are disposed on the ohmic contacts 163b and 165b and the gate insulating film 140.

The data lines 171 for transmitting data signals mainly extend in the longitudinal direction to intersect the gate lines 121a and 121b and the storage electrode line 131.

Each of the data lines 171 includes a plurality of pairs of first and second source electrodes 173a and 173b that extend toward the first and second gate electrodes 124a and 124b in the shape of a U, and end portions 179 that have wide areas for connection to other layers or the data driver 500.

In a case where the data driver 500 is integrated into the substrate 110, the data lines 171 extend to be directly connected to the data driver.

The first and second drain electrodes 175a and 175b are separated from each other and from the data lines 171.

The first/second drain electrode 175a/175b faces the first/second source electrode 173a/173b with the first/second gate electrode 124a/124b interposed therebetween.

The first and second drain electrodes 175a and 175b have bar-shaped end portions at one end and enlarged portions 177a and 177b at the other end, respectively.

The enlarged portions 177a and 177b overlap the storage electrodes 137a and 137b, respectively.

The bar-shaped end portions of the drain electrodes 175a and 175b are partially surrounded by the source electrodes 137a and 137b, respectively.

The first/second gate electrode 124a/124b, the first/second source electrode 173a/173b, and the first/second drain electrode 175a/175b together with the first/second semiconductor 154a/154b constitute a first/second thin film transistor (TFT), and a channel of the first/second thin film transistor is formed in the first/second semiconductor 154a/154b between the first/second source electrode 173a/173b and the first/second drain electrode 175a/175b.

In an exemplary embodiment of the present invention, the data conductors 171, 175a, and 175b are made of molybdenum (Mo), a refractory metal such as chromium (Cr), tantalum (Ta), and titanium (Ti), or an alloy thereof. The data conductors 171, 175a, and 175b may have a multi-layered structure including a refectory metal layer (not shown) and a low-resistivity conductive layer (not shown).

As examples of the multi-layered structure, there is a two-layered structure of a lower chromium or molybdenum (alloy) layer and an upper aluminum layer, and a three-layered structure of a lower molybdenum (alloy) layer, an intermediate aluminum (alloy) layer, and an upper molybdenum (alloy) layer.

Instead of the aforementioned materials, however, the data conductors 171, 175a, and 175b may be made of various metals or conductive materials.

The side surfaces of the data conductors 171, 175a, and 175b are also slanted with respect to the surface of the substrate 110 in a slanted angle ranging from about 30° to about 80°.

The ohmic contacts 163b and 165b are interposed only between the underlying semiconductors 154a and 154b and the overlying data conductors 171, 175a, and 175b, and have a function of reducing contact resistance therebetween.

The semiconductors 154a and 154b have exposed portions uncovered by the data conductors 171, 175a, and 175b such as portions disposed between the source electrodes 173a and 173b and the drain electrodes 175a and 175b.

A protective layer (passivation layer) 180 is formed on the data conductors 171, 175a, and 175b and the exposed portions of the semiconductors 154a and 154b.

The protective layer 180 is made of an inorganic insulating material or an organic insulating material, and a surface thereof may be planarized.

The organic material may have photosensitivity, and a dielectric constant thereof can be about 4.0 or less.

Alternatively, the protective layer 180 may have a double-layered structure of a lower inorganic layer and an upper organic layer in order to sustain an excellent insulating property of the organic layer and protect the exposed portions of the semiconductors 154a and 154b.

A plurality of contact holes 182 that expose end portions 179 of the data lines 171 and a plurality of pairs of contact holes 185a and 185b that expose extensions 177a and 177b of the first and second drain electrodes 175a and 175b are formed in the protective layer 180.

A plurality of contact holes 181a and 181b that expose end portions 129a and 129b of the gate lines 121a and 121b are formed in the protective layer 180 and the gate insulating layer 140.

A plurality of pixel electrodes 191 and a plurality of contact assistants 81a, 81b, and 82 are formed on the protective film 180.

These elements may be made of a transparent conductive material such as ITO and IZO or a metal having an excellent reflectance such as aluminum, silver, chromium, or alloys thereof.

Each of the pixel electrodes 191 has two parallelogrammic electrode pieces having different slant directions, and oblique edges of the two electrode pieces are continuous with each other to form a pair of curved edges having one turning point.

Each of the pixel electrodes 191 includes first to third pixel electrodes 191R, 191G, and 191B that are aligned in the row direction.

The first and second pixel electrodes 191R and 191G are electrically connected to the first and second drain electrodes 175a and 175b through the contact holes 185a and 185b, respectively.

The third pixel electrode 191B is connected to the first drain electrode 175a through the contact hole 185a.

That is, the pixel electrodes 191 are alternately connected to the first and second drain electrodes 175a and 175b.

The data lines 171 and the first and second drain electrodes 175a and 175b are disposed between groups of two pixel electrode columns.

In addition, the storage electrode line 131 is arranged to extend through the turning points of the pixel electrodes 191.

The pixel electrode 191 of the lower panel 100 and the common electrode 270 of the upper panel 200 constitute a capacitor, hereinafter referred to as a liquid crystal capacitor, Clc that sustains the applied voltage after the thin film transistor turns off.

A storage capacitor Cst is formed by overlapping the pixel electrode 191 and the first/second drain electrode 175a/175b connected thereto with the first/second storage electrodes 137a/137b and the storage electrode line 13.

The storage capacitor Cst has the function of increasing the voltage storage capacity of the liquid crystal capacitor Clc.

The contact assistants 81a, 81b, and 82 are connected to the end portions 129a and 129b of the gate lines 121a and 121b and the end portions 179 of the data lines 171 through contact holes 181a, 181b, and 182, respectively.

Therefore, the contact assistants 81a, 81b, and 82 have the function of securing adhesiveness of the exposed end portions 129a and 129b of the gate lines 121a and 121b and the end portion 179 of the data lines 171 to the external devices and protecting the end portions 129a, 129b, and 179.

Next, the upper panel 200 is described.

A light-blocking member 220 is formed on an insulating substrate 210 made of a transparent glass, plastic, or the like.

The light blocking member 220 may include a curved portion (not shown) corresponding to the curved edge of the pixel electrode 191 and a rectangular portion (not shown) corresponding to the thin film transistor, and has the function of preventing light leakage between the pixel electrodes 191 defining an open region facing the pixel electrode 191.

A plurality of color filters 230 are formed on the substrate 210 and the light blocking member 220.

Most portions of the color filters 230 are disposed in regions surrounded by the light-blocking member 220, and the color filters 230 extend along the pixel electrodes 191 of the pixel electrode column.

Each of the color filters 230 can display one of the primary colors such as red, green, and blue.

Therefore, the color filter 230R displaying red corresponds to the first pixel electrode 191R, the color filter 230G displaying green corresponds to the second pixel electrode 191G, and the color filter 230B displaying blue corresponds to the third pixel electrode 191B.

An overcoat film 250 is formed on the color filters 230 and the light-blocking member 220.

The overcoat film 250 may be made of an organic material, and has function of preventing the color filters 230 from being exposed and providing a planarized surface.

The overcoat film 250 may be omitted.

A common electrode 270 is formed on the overcoat film 250.

The common electrode 270 is made of a transparent conductive material such as ITO and IZO and has a plurality of cutout portions 71.

Each cutout portion 71 of the common electrode 270 includes a curved portion having a turning point, a central transverse portion connected to the curved portion having the turning point, and a pair of end transverse portions connected to both ends of the curved portion.

The curved portion is arranged to be substantially parallel to the curved edge of the pixel electrode 191, so as to divide the pixel electrode 191 into left and right half portions.

The central transverse portion of the cutout portion 71 has an obtuse angle with respect to the curved portion, and extends toward a vertex of the left-convex curved edge of the pixel electrode 191. The end transverse portions are aligned with the transverse edges of the pixel electrode 191 and have an obtuse angle with respect to the curved portion.

The number of cutout portions 71 may vary according to design factors, and the light-blocking member 220 overlaps the cutout portions 71 to prevent light leakage in the vicinity of the cutout portions 71.

Alignment films 11 and 21 are disposed on inner surfaces of the panels 100 and 200, respectively, and the alignment films may be vertical alignment films.

Polarizers 12 and 22 are disposed on outer surfaces of the panels 100 and 200, respectively. Polarization axes of the polarizers 12 and 22 are perpendicular to each other and have an angle of about 45° with respect to the curved edge of the pixel electrode 191.

In the case of a reflective liquid crystal display, one of the two polarizers 12 and 22 may be omitted.

The liquid crystal display may further include the polarizers 12 and 22, a phase retardation film, and a light source (backlight unit) (not shown) for supplying light to the panels 100 and 200 and the liquid crystal layer 3.

The liquid crystal layer 3 may have a negative dielectric anisotropic property. In this case, when there is no electric field, long axes of liquid crystal molecules are aligned to be vertical to the surfaces of the two panels 100 and 200.

The cutout portions 71 may be substituted for by protrusions (not shown) or depressions (not shown).

The protrusions may be made of an organic or inorganic material and are disposed above or below the electric field generating electrodes 191 and 270.

Now, a liquid crystal display panel assembly according to an exemplary embodiment of the present invention is described in detail with reference to FIGS. 11, 1, 2, and 5.

Figure 11:
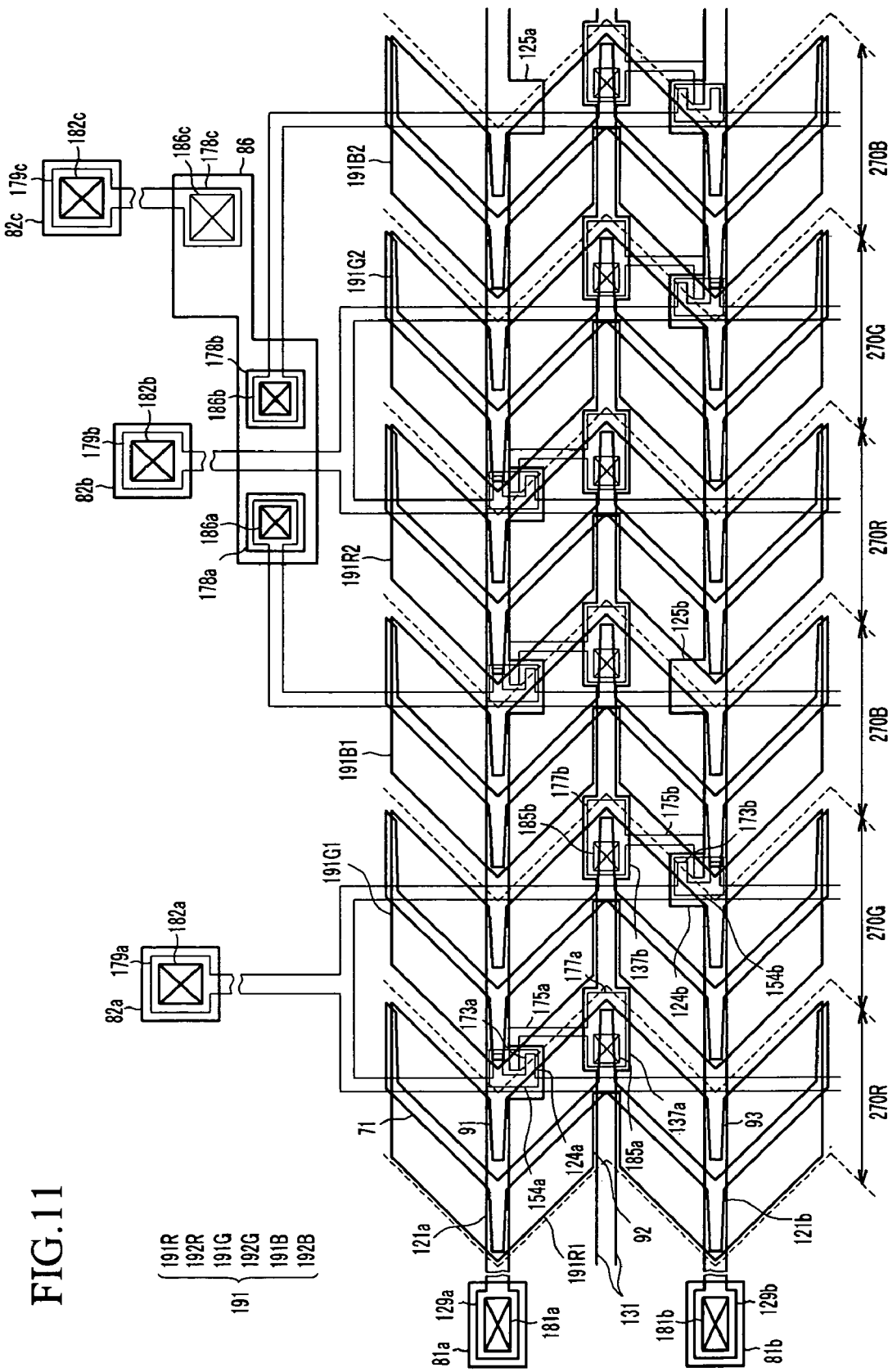
FIG. 11 is a view showing a layout of a liquid crystal display panel assembly according to an exemplary embodiment of the present invention.

FIG. 11 is a view showing a layout of the liquid crystal display panel assembly according to an exemplary embodiment of the present invention.

As shown in FIG. 11, the liquid crystal display panel assembly includes lower and upper panels (not shown) facing each other, and a liquid crystal layer (not shown) interposed therebetween.

The layered structure of the liquid crystal display panel assembly is substantially the same as that of the liquid crystal display panel assembly shown in FIGS. 9 and 10.

In the lower panel, a plurality of gate conductors including a plurality of pairs of first and second gate lines 121a and 121b and a plurality of storage electrode lines 131 are formed on the insulating substrate (not shown).

The gate lines 121a and 121b include gate electrodes 124a and 124b and end portions 129a and 129b, respectively, and each of the storage electrode lines 131 includes storage electrodes 137a and 137b.

A gate insulating film (not shown) is formed on the gate conductors 121a, 121b, and 131.

A plurality of semiconductors 154a and 154b are formed on the gate insulating film, and a plurality of ohmic contacts (not shown) are formed on the semiconductors.

Data conductors including a plurality of data lines 171 and a plurality of first and second drain electrodes 175a and 175b are disposed on the ohmic contacts and the gate insulating film.

Each of the data lines 171 includes a plurality of source electrodes 173a and 173b and end portions 179a, 179b, and 179c, and the drain electrodes 175 and 175b include enlarged end portions 177a and 177b.

A protective film 180 is formed on the data conductors 171, 175a, and 175b and the exposed portions of the semiconductors 154a and 154b, and a plurality of contact holes 181a, 181b, 182a, 182b, 182c, 185a, and 185b are formed on the protective film 180 and the gate insulating film 140.

A plurality of pixel electrodes 191 and a plurality of contact assistants 81, 82a, 82b, and 82c are disposed on the protective film 180.

An alignment film (not shown) is disposed on the pixel electrodes 191, the contact assistants 81, 82a, 82b, and 82c, and the protective film 180.

In the upper panel (not shown), a light blocking member, a plurality of color filters, an overcoat film, a common electrode having cutout portions 71, and an alignment film are formed on an insulating substrate.

In comparison with the liquid crystal display assemblies shown in FIGS. 9 and 5, however, in the liquid crystal display panel assembly according to the exemplary embodiment of the present invention, each of the pixel electrodes 191 is constructed with two pairs of electrode pieces having different slant directions.

More specifically, the right slant parallelogrammic electrode pieces 196 shown in FIG. 3A and the left slant parallelogrammic electrode pieces 197 shown in FIG. 3B are alternately connected to each other in the up-down direction and oblique edges of the electrode pieces of the two pairs of electrode pieces 196 and 196 are continuous with each other to form a pair of curved edges that are curved three times Cutout portions 91, 92, and 93 are formed on the pixel electrode 191.

Each of the cutout portions 91, 92, and 93 is formed to extend from one of three concave vertexes formed by the two pairs of electrode pieces 196 and 197 to the corresponding convex vertex.

The storage electrode line 131 is arranged to extend in the transverse direction through the second turning point among three turning points of the curved edge formed by two pairs of electrode pieces 196 and 197.

In general, alignment of liquid crystal molecule may be easily disturbed in the regions where the electrode pieces 196 and 197 are connected, so that a resultant texture may easily occur. According to the construction, the texture can be shielded, and the aspect ratio can be improved.

The first and second gate lines 121a and 121b are arranged to extend in the transverse direction through other turning points.

The pixel electrodes 191 may be classified into, for example, red, green, and blue pixel electrodes 191R, 191G, and 191B corresponding to the color filters 270R, 270G, and 270B for respectively displaying three colors.

The red pixel electrodes 191R are connected to first drain electrodes 173a, and the green pixel electrodes 191G are connected to second drain electrodes 173b. The blue pixel electrodes 191B are alternately connected to the first and second drain electrodes 173a and 173b.

The pixel electrodes 191 connected to the drain electrodes 175a and 175b are applied with data voltages from the associated data lines 171.

The data line 171 connected to the first/second red pixel electrode 191Ra/191Rb and the data line 171 connected to the first/second green pixel electrode 191Ga/191Gb are connected to each other and share an end portion 179a/179b.

Each of the data lines 171 connected to the first blue pixel electrodes 191Ba includes an enlarged portion 178a having a wide area, and each of the data lines 171 connected to the second blue pixel electrodes 191Bb includes an enlarged portion 178b having a wide area.

The two enlarged portions 178a and 178b are connected to a connection member 86 made of ITO or the like through contact holes 186a and 186b, respectively.

In addition, the two enlarged portions 178a and 178b are connected to another enlarged portion 178c and the connection member 86 through a contact hole 186c.

Therefore, the two data lines 171 connected to the first and second blue pixel electrodes 191Ba and 191Bb share the end portion 179c that has a wide area for connection to other layers or external driver circuits.

As a result, it is possible to reduce the number of data drivers by half.

In portions of the gate lines 121a and 121b overlapping the blue pixel electrodes 191Ba and 191Bb, gate protrusions 125a and 125b are formed in the same shape as that of the gate electrodes 124a and 124b on regions of the source electrodes 173a and 173b and the drain electrodes 175a and 175b.

As a result, it is possible to equalize overlap areas of all the blue pixel electrodes 191B overlapping the gate lines.

The operations of the aforementioned liquid crystal display, the polarities of pixel electrodes, and the inversion driving therefor can be employed by the liquid crystal display panel assembly shown in FIG. 11 and the liquid crystal display including the liquid crystal display panel assembly.

In addition, other features of the liquid crystal display panel assembly shown in FIGS. 9 and 10 can be employed by the liquid crystal display panel assembly shown in FIG. 11.

Now, a liquid crystal display panel assembly according to an exemplary embodiment of the present invention is described in detail with reference to FIG. 12.

Figure 12:
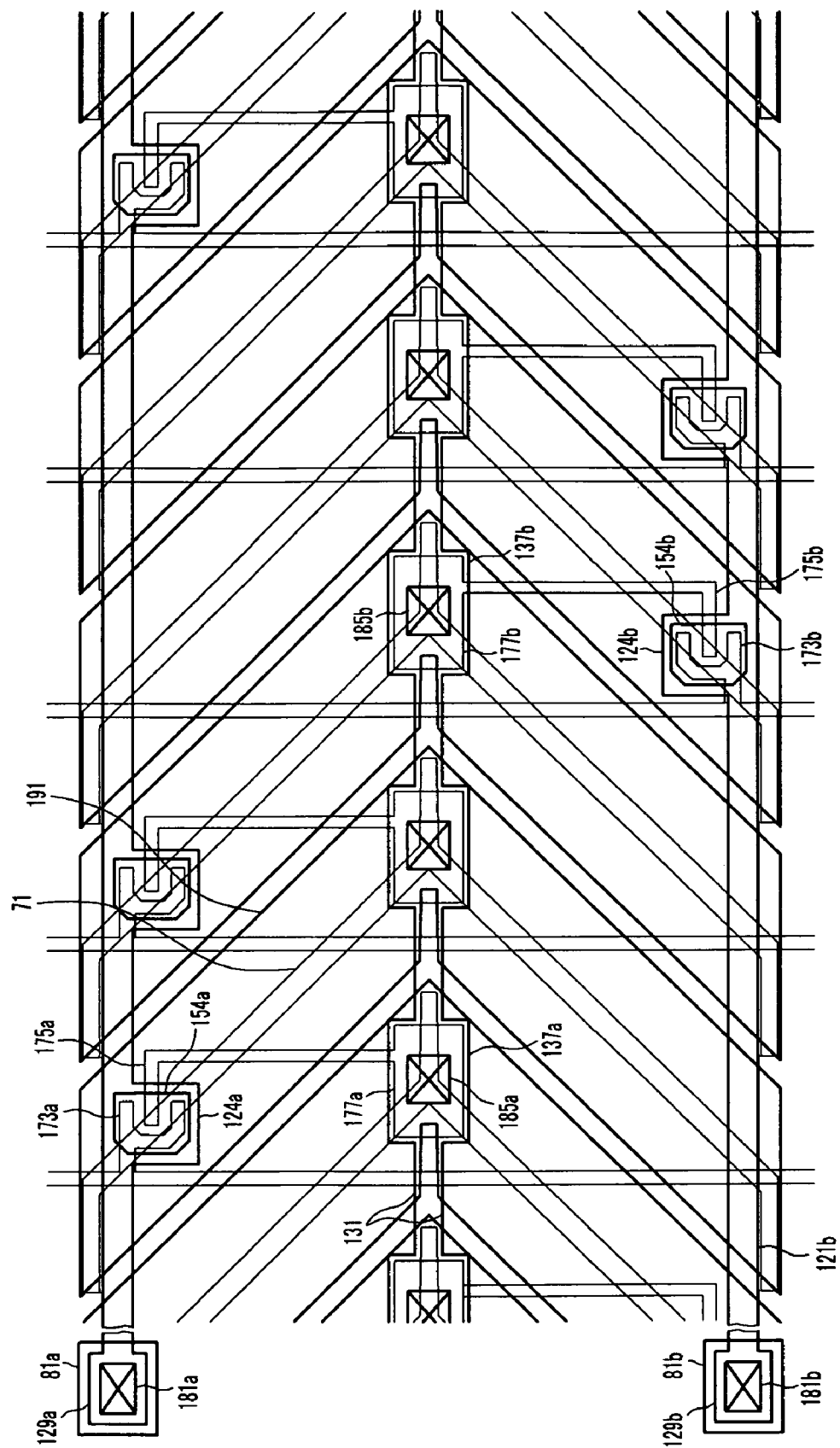
FIG. 12 is a view showing a layout of a liquid crystal display panel assembly according to an exemplary embodiment of the present invention.

FIG. 12 is a view showing a layout of the liquid crystal display panel assembly according to an exemplary embodiment of the present invention.

As shown in FIG. 12, the liquid crystal display panel assembly includes lower and upper panels (not shown) facing each other and a liquid crystal layer (not shown) interposed therebetween.

The layered structure of the liquid crystal display panel assembly is substantially the same as that of the liquid crystal display panel assembly shown in FIGS. 9 and 10.

In the lower panel, a plurality of gate conductors including a plurality of pairs of first and second gate lines 121a and 121b and a plurality of storage electrode lines 131 are formed on the insulating substrate (not shown).

The gate lines 121a and 121b include gate electrodes 124a and 124b and end portions 129a and 129b, respectively, and each of the storage electrode lines 131 includes storage electrodes 137a and 137b.

A gate insulating film (not shown) is formed on the gate conductors 121a, 121b, and 131.

A plurality of semiconductors 154a and 154b are disposed on the gate insulating film, and a plurality of ohmic contacts (not shown) is disposed on the semiconductors.

Data conductors including a plurality of data lines 171 and a plurality of first and second drain electrodes 175a and 175b are disposed on the ohmic contacts and the gate insulating film.

Each of the data lines 171 includes a plurality of source electrodes 173a and 173b and end portions 179a, 179b, and 179c, and the drain electrodes 175 and 175b include enlarged end portions 177a and 177b.

A protective film 180 is formed on the data conductors 171, 175a, and 175b and the exposed portions of the semiconductors 154a and 154b, and a plurality of contact holes 181, 185a, and 185b are formed on the protective film 180 and the gate insulating film 140.

A plurality of pixel electrodes 191 and a plurality of contact assistants 81 are disposed on the protective film 180.

An alignment film (not shown) is disposed on the pixel electrode 191, the contact assistants 81, and the protective film 180.

In the upper panel (not shown), a light blocking member, a plurality of color filters, an overcoat film, a common electrode having cutout portions 71, and an alignment film are formed on an insulating substrate.

Unlike the liquid crystal display panel assembly shown in FIG. 11, however, in the liquid crystal display panel assembly according to the exemplary embodiment of the present invention, the pixel electrodes 191 have two parallelogrammic electrode pieces having different slant directions.

Namely, the right slant parallelogrammic electrode pieces shown in FIG. 3A and the left slant parallelogrammic electrode pieces shown in FIG. 3B are connected to each other in the up-down direction In addition, other features of the liquid crystal display panel assembly shown in FIG. 11 can be employed by the liquid crystal display panel assembly shown in FIG. 12.

Now, a liquid crystal display panel assembly according to an exemplary embodiment of the present invention is described in detail with reference to FIGS. 13, 14, and 12.

Figure 13:
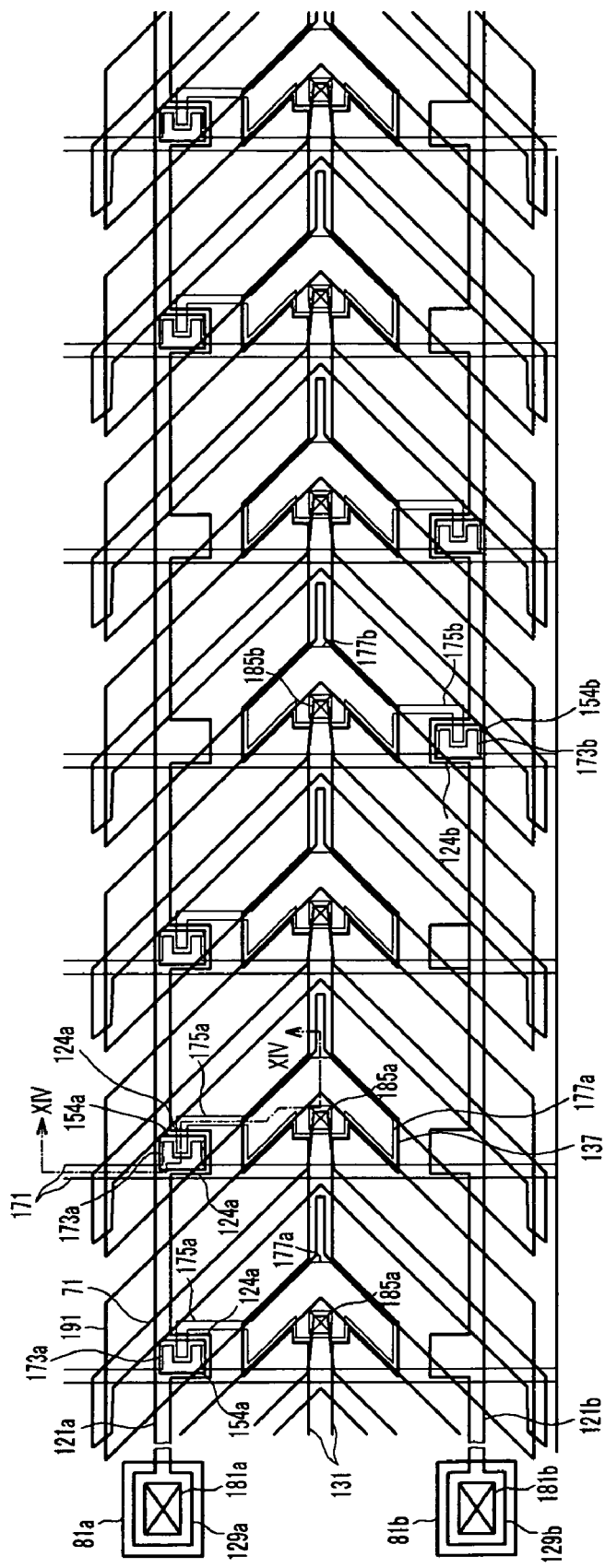
FIG. 13 is a view showing a layout of a liquid crystal display panel assembly according to an exemplary embodiment of the present invention.
Figure 14:
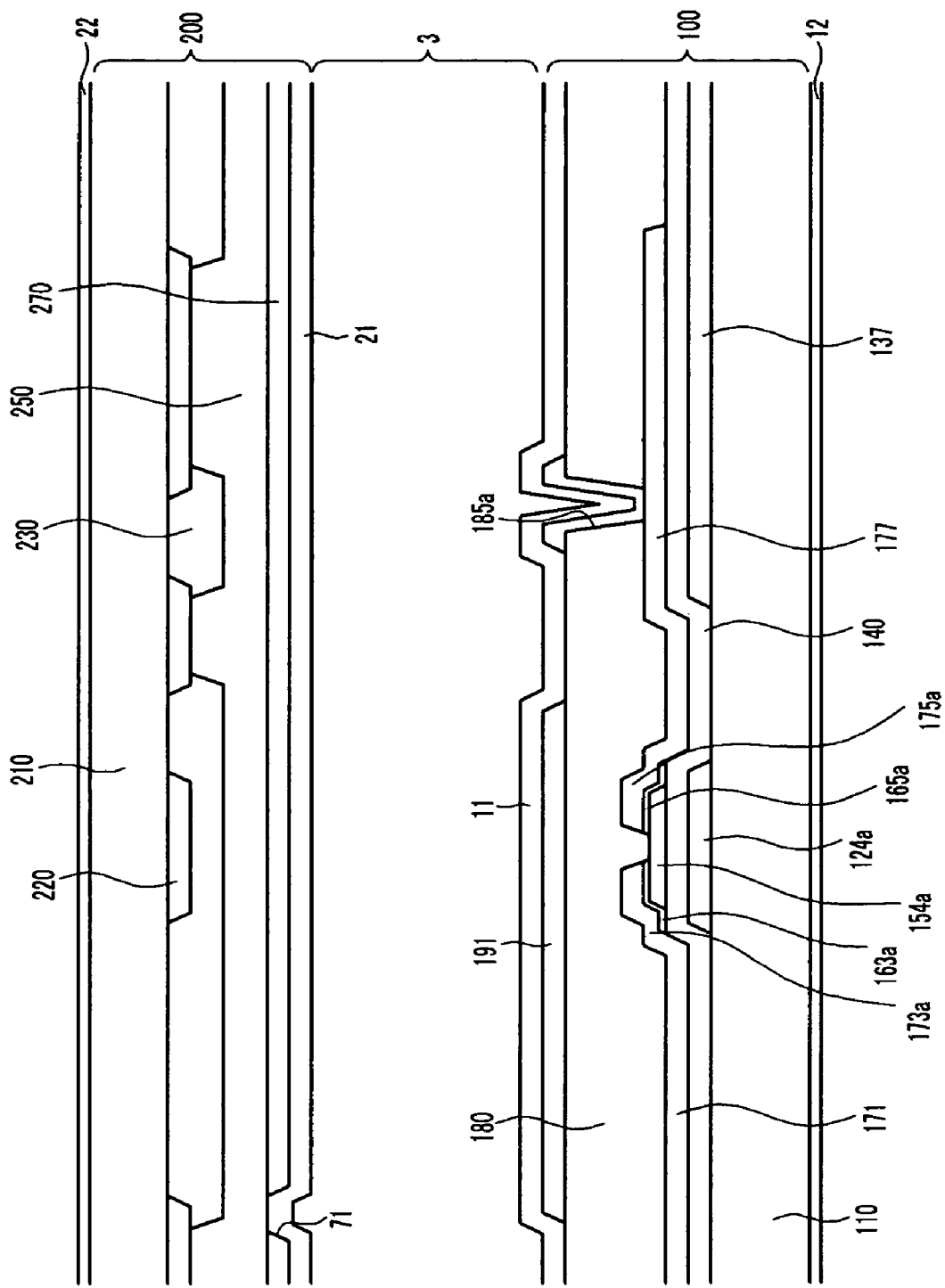
FIG. 14 is a cross-sectional view of the liquid crystal display panel assembly taken along line XIV-XIV of FIG. 13.

FIG. 13 is a view showing a layout of the liquid crystal display panel assembly according to an exemplary embodiment of the present invention, and FIG. 14 is a cross-sectional view of the liquid crystal display panel assembly taken along line XIV-XIV of FIG. 13.

As shown in FIGS. 13 and 14, the liquid crystal display panel assembly includes lower and upper panels 100 and 200 facing each other, and a liquid crystal layer 3 interposed therebetween.

In the lower panel 100, a plurality of gate conductors including a plurality of pairs of first and second gate lines 121a and 121b and a plurality of storage electrode lines 131 are formed on the insulating substrate 110.

The gate lines 121a and 121b includes gate electrodes 124a and 124b and end portions 129a and 129b, respectively, and each of the storage electrode lines 131 includes storage electrodes 137a and 137b.

A gate insulating film 140 is formed on the gate conductors 121a, 121b, and 131.

A plurality of semiconductors 154a and 154b are disposed on the gate insulating film, and a plurality of ohmic contacts 163a and 163b are disposed on the semiconductors.

Data conductors including a plurality of data lines 171 and a plurality of first and second drain electrodes 175a and 175b are disposed on the ohmic contacts 163a and 163b and the gate insulating film 140.

Each of the data lines 171 includes a plurality of source electrodes 173a and 173b and end portions (not shown), and the drain electrodes 175 and 175b includes enlarged end portions 177a and 177b.

A protective film 180 is formed on the data conductors 171, 175a, and 175b and the exposed portions of the semiconductors 154a and 154b, and a plurality of contact holes 181, 185a, and 185b are formed on the protective film 180 and the gate insulating film 140.

A plurality of pixel electrodes 191 and a plurality of contact assistants 81 are disposed on the protective film 180.

An alignment film 11 is disposed on the pixel electrode 191, the contact assistants 81, and the protective film 180.

In the upper panel 200, a light blocking member 220, a plurality of color filters 230, an overcoat film 250, a common electrode 270 having cutout portions 71, and an alignment film 21 are formed on the insulating substrate 210.

Unlike the liquid crystal display panel assembly shown in FIG. 12, however, in the liquid crystal display panel assembly shown in FIGS. 13 and 14, the storage electrodes 137a and 137b are arranged to extend along gaps between the pixel electrodes 191.

In addition, the enlarged portions 177a and 177b of the drain electrodes 175a and 175b are arranged to extend along the gaps between the pixel electrodes 191 and overlap the storage electrodes 137a and 137b.

By constructing the drain electrodes 175a and 175b in such a form, it is possible to more effectively block light and prevent light leakage between the pixel electrodes 191.

In addition, other features of the liquid crystal display panel assembly shown in FIG. 12 can be employed by the liquid crystal display panel assembly shown in FIGS. 13 and 14.

Now, a liquid crystal display panel assembly according to an exemplary embodiment of the present invention is described in detail with reference to FIGS. 15, 16, 13, and 14.

Figure 15:
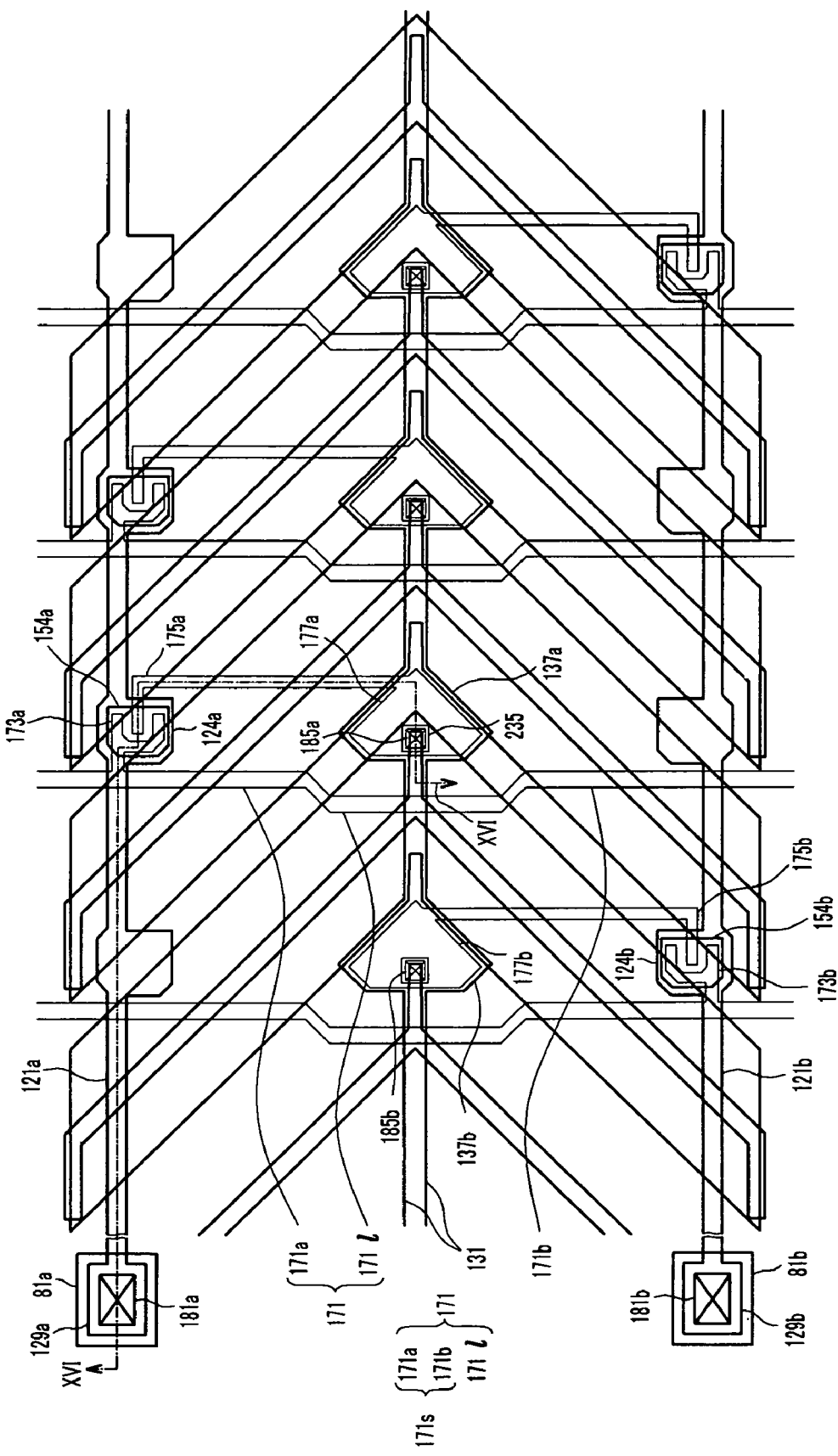
FIG. 15 is a view showing a layout of a liquid crystal display panel assembly according to an exemplary embodiment of the present invention.
Figure 16:
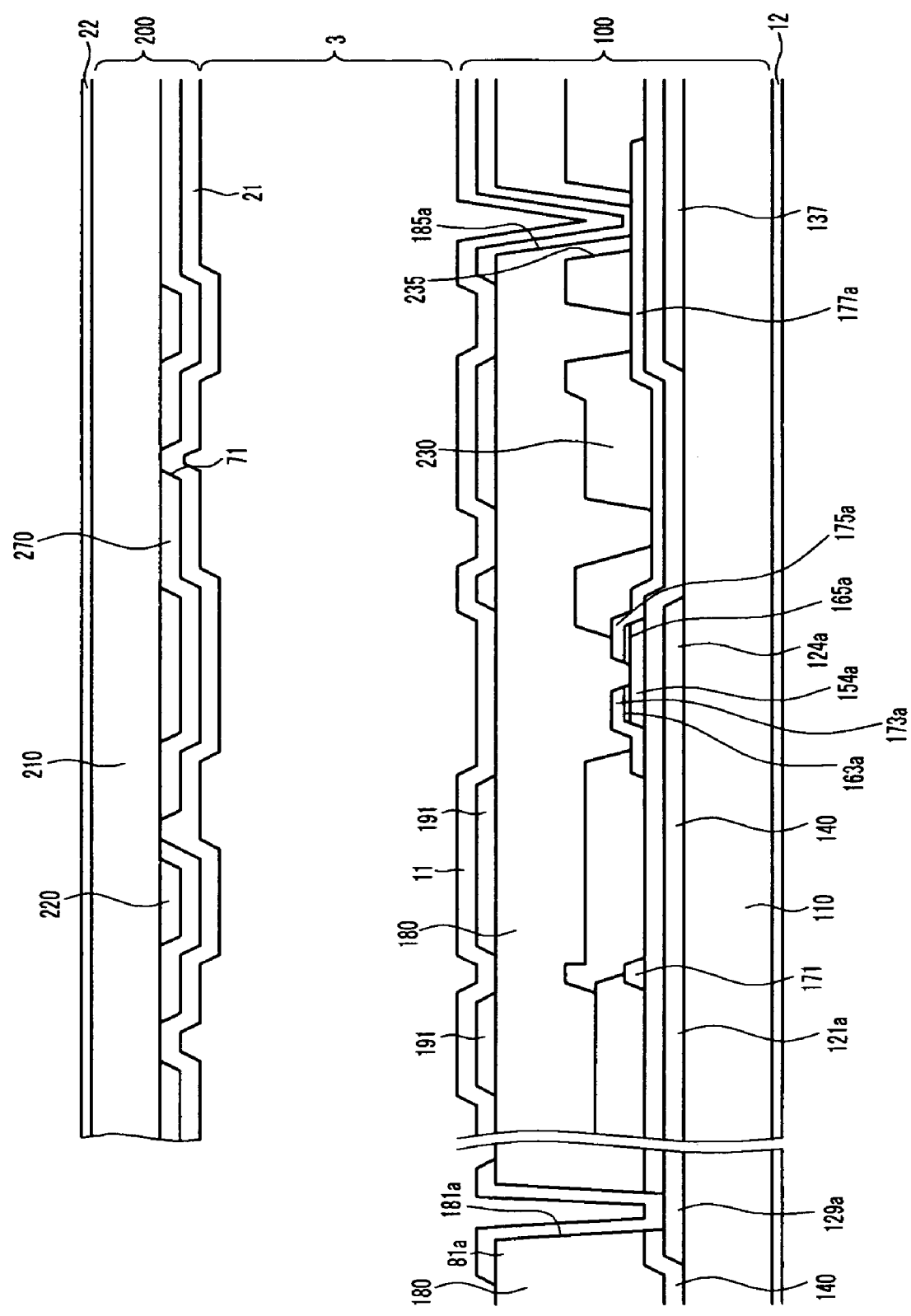
FIG. 16 is a cross-sectional view of the liquid crystal display panel assembly taken along line XVI-XVI of FIG. 15.

FIG. 15 is a view showing a layout of the liquid crystal display panel assembly according to an exemplary embodiment of the present invention, and FIG. 16 is a cross-sectional view of the liquid crystal display panel assembly taken along line XVI-XVI of FIG. 15.

As shown in FIGS. 15 and 16, the liquid crystal display panel assembly includes lower and upper panels 100 and 200 facing each other, and a liquid crystal layer 3 interposed therebetween.

In the lower panel 100, a plurality of gate conductors including a plurality of pairs of first and second gate lines 121a and 121b and a plurality of storage electrode lines 131 are formed on the insulating substrate 110.

The gate lines 121a and 121b include gate electrodes 124a and 124b and end portions 129a and 129b, respectively, and each of the storage electrode lines 131 includes storage electrodes 137a and 137b.

A gate insulating film 140 is formed on the gate conductors 121a, 121b, and 131.

A plurality of semiconductors 154a and 154b are disposed on the gate insulating film, and a plurality of ohmic contacts 163a and 163b are disposed on the semiconductors.

Data conductors including a plurality of data lines 171 and a plurality of first and second drain electrodes 175a and 175b are disposed on the ohmic contacts 163a and 163b and the gate insulating film 140.

Each of the data lines 171 includes a plurality of source electrodes 173a and 173b and end portions (not shown), and the drain electrodes 175 and 175b include enlarged end portions 177a and 177b.

A protective film 180 is formed on the data conductors 171, 175a, and 175b and the exposed portions of the semiconductors 154a and 154b, and a plurality of contact holes 181, 185a, and 185b are formed on the protective film 180 and the gate insulating film 140.

A plurality of pixel electrodes 191 and a plurality of contact assistants 81 are disposed on the protective film 180.

An alignment film 11 is disposed on the pixel electrodes 191, the contact assistants 81, and the protective film 180.

In the upper panel 200, a light blocking member 220, a plurality of color filters 230, an overcoat film 250, a common electrode 270 having cutout portions 71, and an alignment film 21 are formed on the insulating substrate 210.

Unlike the liquid crystal display panel assembly shown in FIGS. 13 and 14, however, in the liquid crystal display panel assembly shown in FIGS. 15 and 16, each of the data lines 171 includes first and second portions 171n and 171l having different widths.

The width of the second portion 171l is larger than that of the first portion 171, and the width of the second portion 171l is about twice that of the first portion 171n.

The first portion 171n includes third and fourth portions 171a and 171b that are disposed above and below the second portion 171l, respectively.

The third and fourth portions 171a and 171b are aligned in a straight line, and the second portion 171l is disposed to deviate from the straight line.

Therefore, an overlap area of one pixel electrode 191 and an overlap area of the adjacent pixel electrode 191 in one data line 171 can be equalized, so that it is possible to prevent a variation in the pixel electrode voltage caused from parasitic capacitance generated between the data line 171 and the pixel electrodes 191.

Unlike the liquid crystal display panel assembly shown in FIGS. 13 and 14, in this liquid crystal display panel assembly, the color filters 230 are provided not to the common electrode panel 200 but under the protective film 180 of the thin film transistor panel 100.

The color filters 230 are arranged to extend in a stripe pattern along the pixel electrode column, and two adjacent color filters 230 are arranged to overlap each other in regions above the data lines 171.

The overlapped color filters 230 are constructed with an organic film, so as to insulate the pixel electrodes 191 from the data lines 171.

Therefore, even in a case where the insulating film 180 is not constructed with an organic film, it is possible to prevent a parasitic capacitance from being generated in the overlapped regions of the pixel electrodes 191 and the data lines 171.

In addition, the color filters 230 may have a function as a light blocking member for preventing light leakage between the pixel electrodes 191.

In this case, the light blocking member 220 on the common electrode panel 200 can be omitted, so that the production process can be simplified.

The color filters 230 are provided with through-holes 235 for access to the contact holes 185, and the through-holes 235 are wider than the contact holes 185.

Peripheral regions where the end portions 129 of the gate lines 121 and the end portions 179 of the data lines 171 are disposed are not provided with the color filters 230.

A protective film (not shown) may also be disposed under the color filters 230.

In addition, other features of the liquid crystal display panel assembly shown in FIGS. 13 and 14 can be employed by the liquid crystal display panel assembly shown in FIGS. 15 and 16.

Now, a liquid crystal display panel assembly according to an exemplary embodiment of the present invention is described in detail with reference to FIGS. 17 and 11.

Figure 17:
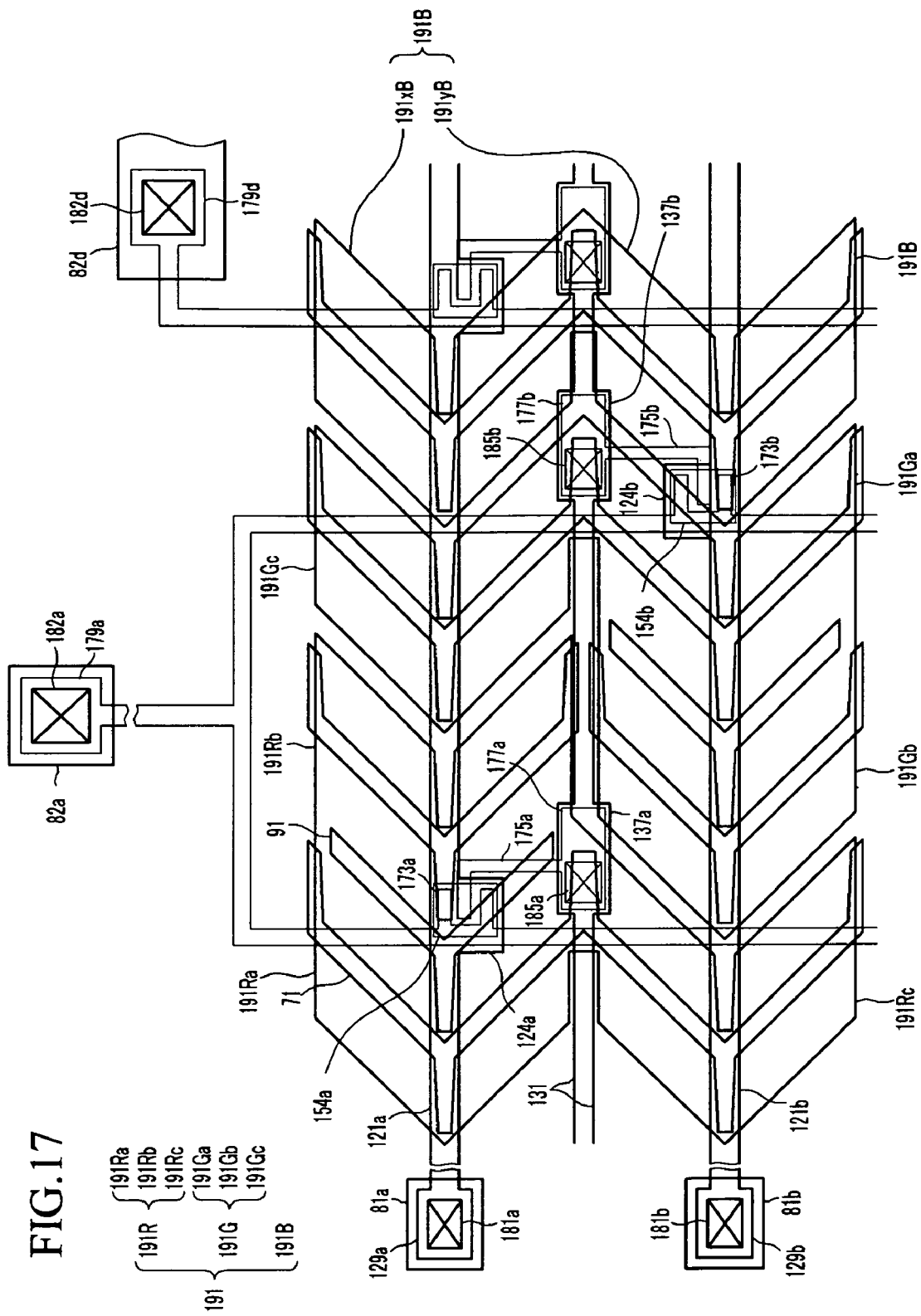
FIG. 17 is a view showing a layout of a liquid crystal display panel assembly according to an exemplary embodiment of the present invention.

FIG. 17 is a view showing a layout of the liquid crystal display panel assembly according to an exemplary embodiment of the present invention.

As shown in FIG. 17, the liquid crystal display panel assembly includes lower and upper panels (not shown) facing each other, and a liquid crystal layer (not shown) interposed therebetween.

The layered structure of the liquid crystal display panel assembly according to the embodiment is substantially the same as that of the liquid crystal display panel assembly shown in FIG. 11.

In the lower panel, a plurality of gate conductors including a plurality of pairs of first and second gate lines 121a and 121b and a plurality of storage electrode lines 131 are formed on the insulating substrate (not shown).

The gate lines 121a and 121b include gate electrodes 124a and 124b and end portions 129a and 129b, respectively, and each of the storage electrode lines 131 includes storage electrodes 137a and 137b.

A gate insulating film 140 is formed on the gate conductors 121a, 121b, and 131.

A plurality of semiconductors 154a and 154b are disposed on the gate insulating film 140, and a plurality of ohmic contacts (not shown) is disposed on the semiconductors.

Data conductors including a plurality of data lines 171 and a plurality of first and second drain electrodes 175a and 175b are disposed on the ohmic contacts and the gate insulating film 140.

Each of the data lines 171 includes a plurality of source electrodes 173a and 173b and end portions 179a, 179b, and 179c, and the drain electrodes 175 and 175b include enlarged end portions 177a and 177b.

A protective film 180 is formed on the data conductors 171, 175a, and 175b and the exposed portions of the semiconductors 154a and 154b, and a plurality of contact holes 181, 185a, and 185b are formed on the protective film 180 and the gate insulating film 140.

A plurality of pixel electrodes 191 and a plurality of contact assistants 81 are disposed on the protective film 180.

An alignment film (not shown) is disposed on the pixel electrode 191, the contact assistants 81, and the protective film 180.

In the upper panel (not shown), a light blocking member, a plurality of color filters, an overcoat film, a common electrode having cutout portions 71, and an alignment film are formed on an insulating substrate.

Unlike the liquid crystal display panel assembly shown in FIG. 11, however, in this liquid crystal display panel assembly, the pixel electrodes 191 have different shapes.

Each of the red and green pixel electrodes 191R and 191G includes three parallelogrammic electrode pieces having different slant directions.

As shown in FIG. 3A, the red pixel electrode 191R includes first to third base electrodes 191R1, 191R2, and 191R3 having right and left slant parallelogrammic electrode pieces 196 and 197. Similarly, the green pixel electrode 191G includes first to third base electrodes 191G1, 191G2, and 191G3 having right and left slant parallelogrammic electrode pieces 196 and 197.

The adjacent first and second base electrodes 191R1 and 191R2/191G1 and 191G2 are connected to each other in the row direction, and the adjacent third base electrodes 191R3/191G3 are connected to each other in the column direction of the first base electrode 191R1/191G1.

The red pixel electrode 191R and the green pixel electrode 191G have inversion symmetry.

Unlike the red and green pixel electrodes 19R and 19G, the blue pixel electrode 191B includes two pairs of electrode pieces having different slant directions.

Namely, the right slant parallelogrammic electrode pieces 196 shown in FIG. 3A and the left slant parallelogrammic electrode pieces 197 shown in FIG. 3B are alternately disposed in the row direction.

The electrode pieces constituting the blue pixel electrode 191B are wider than the electrode pieces constituting the red and green pixel electrodes 191R and 191G, and, the electrode pieces constituting the blue pixel electrode 191B have widths that are about 1.4 times to 1.6 times those of the electrode pieces constituting the red and green pixel electrodes 191R and 191G.

As a result, it is possible to equalize the areas of the pixel electrodes 191 irrespective of shapes of the pixel electrodes.

In addition, other features of the liquid crystal display panel assembly shown in FIG. 11 can be employed by the liquid crystal display panel assembly shown in FIG. 17.

Now, a liquid crystal display panel assembly according to an exemplary embodiment of the present invention is described in detail with reference to FIGS. 18 and 7.

Figure 18:
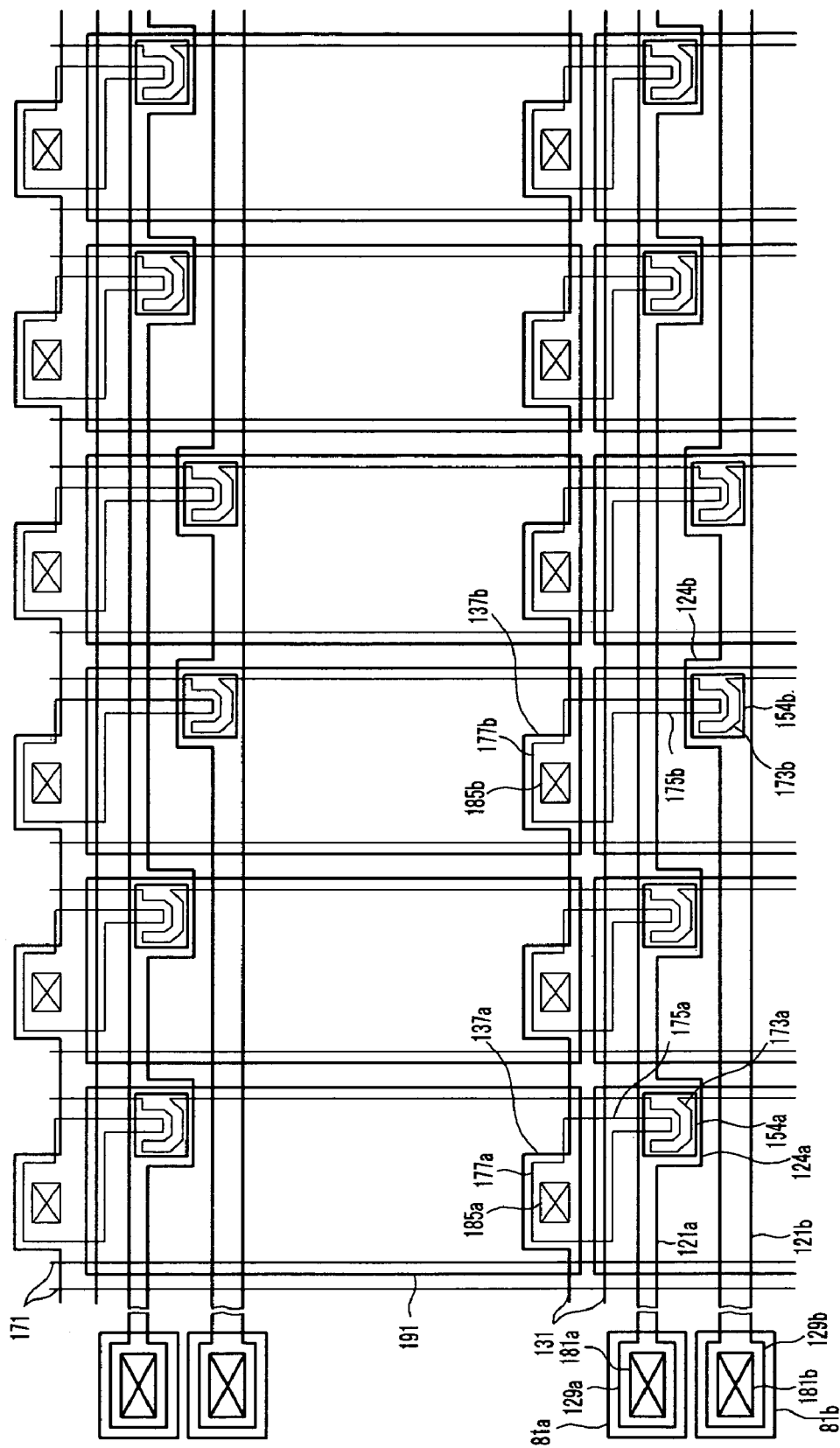
FIG. 18 is a view showing a layout of a liquid crystal display panel assembly according to an exemplary embodiment of the present invention.

FIG. 18 is a view showing a layout of the liquid crystal display panel assembly according to an exemplary embodiment of the present invention.

As shown in FIG. 18, the liquid crystal display panel assembly includes lower and upper panels (not shown) facing each other, and a liquid crystal layer (not shown) interposed therebetween.

The layered structure of the liquid crystal display panel assembly according to the exemplary embodiment of the present invention is similar to that of the liquid crystal display panel assembly shown in FIGS. 9 and 10.

In the lower panel, a plurality of gate conductors including a plurality of pairs of first and second gate lines 121a and 121b and a plurality of storage electrode lines 131 are formed on the insulating substrate (not shown).

The gate lines 121a and 121b include gate electrodes 124a and 124b and end portions 129a and 129b, respectively, and each of the storage electrode lines 131 includes storage electrodes 137a and 137b.

A gate insulating film (not shown) is formed on the gate conductors 121a, 121b, and 131.

A plurality of semiconductors 154a and 154b are disposed on the gate insulating film, and a plurality of ohmic contacts (not shown) is disposed on the semiconductors.

Data conductors including a plurality of data lines 171 and a plurality of first and second drain electrodes 175a and 175b are disposed on the ohmic contacts and the gate insulating film.

Each of the data lines 171 includes a plurality of source electrodes 173a and 173b and end portions (not shown), and the drain electrodes 175 and 175b include enlarged end portions 177a and 177b.

A protective film 180 is formed on the data conductors 171, 175a, and 175b and the exposed portions of the semiconductors 154a and 154b, and a plurality of contact holes 181, 185a, and 185b are formed on the protective film 180 and the gate insulating film 140.

A plurality of pixel electrodes 191 and a plurality of contact assistants 81 are disposed on the protective film 180.

An alignment film (not shown) is disposed on the pixel electrodes 191, the contact assistants 81, and the protective film 180.

In the upper panel (not shown), a light blocking member, a plurality of color filters, an overcoat film, a common electrode, and an alignment film are disposed on the insulating substrate.

Unlike the above-described exemplary embodiment of the present invention, in the liquid crystal display panel assembly, all the pairs of first and second gate lines 121a and 121b are disposed under the storage electrode lines 131.

In addition, each pixel electrode 191 includes two edges parallel to the gate lines 121a and 121b and two edges parallel to the data lines 171, and a portion thereof overlaps the data lines 171, so that it is possible to maximize the aspect ratio.

Each pixel electrode 191 overlaps the last stage gate line disposed just above to constitute a storage capacitor, so that the storage capacitance is increased.

As shown in FIG. 9, with respect to the data lines 171, end portions of the odd-numbered data lines 171 are shared, and end portions of the even-numbered data lines 171 are shared.

Description thereof is the same as that corresponding to FIG. 9, and thus the description is omitted.

Features of the liquid crystal display shown in FIGS. 9 to 17 can be employed by the liquid crystal display shown in FIG. 18.

According to exemplary embodiments of the present invention, it is possible to prevent a variation in luminance and aspect ratio among pixels and to reduce the number of data drivers and production costs.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
    a plurality of pixels arranged in a matrix, a pixel of the plurality of pixels including a pixel electrode and a switching device connected to the pixel electrode;
    a plurality of pairs of first and second gate lines separated from each other, wherein a plurality of switching devices of a same pixel row are connected to one pair of the first gate line and the second gate line; and
    a plurality of data lines, wherein a data line of the plurality of data lines is connected to the switching devices and intersects both the first gate line and the second gate line,
    wherein end portions of two data lines forming a pair are directly connected to each other,
    the pixels include a first pixel, a second pixel and a third pixel representing three different colors, respectively;
    a data line connected to a switching device of the first pixel and a data line connected to a switching device of the second pixel are directly connected to each other, and
    two substantially parallel adjacent data lines respectively connected to a switching device of a first third pixel and a switching device of a second third pixel are directly connected to each other.

2. The liquid crystal display of claim 1, wherein the pixel electrode includes at least two parallelogrammic electrode pieces having different respective slant directions.

3. The liquid crystal display of claim 2, wherein the pixel electrode includes one right slant parallelogrammic electrode piece and one left slant parallelogrammic electrode piece.

4. The liquid crystal display of claim 2, wherein the pixel electrode includes two right slant parallelogrammic electrode pieces and two left slant parallelogrammic electrode pieces.

5. The liquid crystal display of claim 4, wherein the right slant parallelogrammic electrode pieces and the left slant parallelogrammic electrode pieces are alternately arrayed upward and downward.

6. The liquid crystal display of claim 5, wherein the first gate line and the second gate line extend along a boundary where the right slant parallelogrammic electrode pieces and the left slant parallelogrammic electrode pieces are connected to each other in an up-down direction.

7. The liquid crystal display of claim 1,
    wherein the pixel electrodes of the first and second pixels includes three right slant parallelogrammic electrode pieces and three left slant parallelogrammic electrode pieces, and
    wherein the pixel electrode of the third pixel includes two right slant parallelogrammic electrode pieces and two left slant parallelogrammic electrode pieces.

8. The liquid crystal display of claim 7,
    wherein the three right slant parallelogrammic electrode pieces and the three left slant parallelogrammic electrode pieces of the pixel electrode of each of the first and second pixels are connected to each other in an up-down direction to constitute a first base electrode, a second base electrode and a third base electrode,
    wherein the first and second base electrodes are connected to each other in a row direction,
    wherein the first and third base electrodes are connected to each other in a column direction, and
    wherein the right slant parallelogrammic electrode pieces and the left slant parallelogrammic electrode pieces of the pixel electrode of the third pixel are alternately connected upwardly and downwardly.

9. The liquid crystal display of claim 7, wherein areas of the pixel electrodes of the first, second, and third pixels are substantially equal to each other.

10. The liquid crystal display of claim 9, wherein a width of the pixel electrode of the third pixel is greater than widths of the pixel electrodes of the first and second pixels.

11. The liquid crystal display of claim 10, wherein the width of the pixel electrode of the third pixel is 1.4 to 1.6 times the widths of the first and second pixels.

12. The liquid crystal display of claim 11, wherein the pixel electrodes of the first and second pixels have left-right inverted symmetry.

13. The liquid crystal display of claim 1, wherein the first pixel is connected to the first gate line.

14. The liquid crystal display of claim 1, wherein the second pixel is connected to the second gate line.

15. The liquid crystal display of claim 1, wherein the third pixels at different columns are alternately connected to the first or second gate line.

16. The liquid crystal display of claim 15, wherein the third pixels at the different columns are alternately charged.

17. The liquid crystal display of claim 1, further comprising gate protrusions, wherein at least one gate protrusion is disposed at portions where the data lines intersect the first and second gate lines.

18. The liquid crystal display of claim 1, wherein the pixel electrode has four edges that are parallel to the gate and data lines.

19. The liquid crystal display of claim 18, wherein a portion of the data line overlaps the pixel electrode.

20. The liquid crystal display of claim 18, wherein the pixel electrode covers first and second gate lines of a last stage.

21. The liquid crystal display of claim 1, further comprising storage electrode lines that transmit storage electrode signals.

22. The liquid crystal display of claim 21, wherein the storage electrode lines include extensions that extend upward and downward.

23. The liquid crystal display of claim 22, wherein the extensions of the storage electrode lines extend into spaces between adjacent pixel electrodes.

24. The liquid crystal display of claim 1, wherein the data lines includes first and second portions that overlap two adjacent pixel electrodes, respectively.

25. The liquid crystal display of claim 24, wherein areas of the first and second portions of the data line are equal to each other.

26. The liquid crystal display of claim 24, wherein widths of the first and second portions of the data line are different from each other.

27. The liquid crystal display of claim 24, wherein a length of the first portion is greater than a length of the second portion, and a width of the first portion is narrower than a width of the second portion.

28. The liquid crystal display of claim 24, wherein the first portion includes third and fourth portions that are separated from one of the two pixel electrodes and overlap one of the two adjacent pixel electrodes.

29. The liquid crystal display of claim 28, wherein the third and fourth portions of the data line are disposed along a straight line, and the second portion is curved at the third and fourth portions.

30. The liquid crystal display of claim 1, wherein the data line extends in a straight line.

31. The liquid crystal display of claim 1, wherein polarities of data voltages of two adjacent data lines among the plurality of data lines are opposite to each other.

32. The liquid crystal display of claim 1, wherein adjacent data lines are connected to each other.

33. The liquid crystal display of claim 1, further comprising organic films that are formed between the pixel electrodes and the data lines and between the pixel electrodes and the first and second gate lines.

34. The liquid crystal display of claim 1, further comprising a plurality of color filters that are disposed under the pixel electrodes.

35. The liquid crystal display of claim 1, wherein overlapped areas of the first and second gate lines respectively overlapping the third pixel are equal to each other.

* * * * *